United States Patent
Wang et al.

(10) Patent No.: US 12,430,163 B2
(45) Date of Patent: Sep. 30, 2025

(54) METHOD FOR ENTERING SYSTEM MANAGEMENT MODE, PROCESSOR, AND COMPUTER SYSTEM

(71) Applicant: Shanghai Zhaoxin Semiconductor Co., Ltd., Shanghai (CN)

(72) Inventors: Weilin Wang, Beijing (CN); Yankui Niu, Beijing (CN); Jinglong Liu, Beijing (CN); Jiangbo Wang, Beijing (CN); Yingbing Guan, Shanghai (CN); Long Cheng, Shanghai (CN)

(73) Assignee: SHANGHAI ZHAOXIN SEMICONDUCTOR CO., LTD., Shanghai (CN)

(*) Notice: Subject to any disclaimer, the term of this patent is extended or adjusted under 35 U.S.C. 154(b) by 0 days.

(21) Appl. No.: 18/619,642

(22) Filed: Mar. 28, 2024

(65) Prior Publication Data
US 2025/0181382 A1 Jun. 5, 2025

(30) Foreign Application Priority Data
Nov. 30, 2023 (CN) .......................... 202311628148.5

(51) Int. Cl.
*G06F 9/46* (2006.01)
*G06F 9/48* (2006.01)

(52) U.S. Cl.
CPC .................................. *G06F 9/4812* (2013.01)

(58) Field of Classification Search
CPC ........................... G06F 9/84812; G06F 9/4812
See application file for complete search history.

(56) References Cited

U.S. PATENT DOCUMENTS

| 5,623,673 A | 4/1997 | Gephardt |
| 11,188,640 B1 * | 11/2021 | Powell ................ G06F 21/60 |

(Continued)

FOREIGN PATENT DOCUMENTS

| CN | 1367432 A | 9/2002 |
| CN | 102455939 A | 5/2012 |

(Continued)

OTHER PUBLICATIONS

Chinese language office action dated Jan. 5, 2024, issued in application No. CN 202311628148.5.
(Continued)

*Primary Examiner* — Tammy E Lee
(74) *Attorney, Agent, or Firm* — McClure, Qualey & Rodack, LLP

(57) ABSTRACT

The present invention relates to a method for a processor and a computer system to enter system management mode (SMM). The method is applied to the processor, which includes at least one logical core. The method includes entering the SMM in response to a system management interrupt (SMI), storing current state information to a corresponding state save area; setting operation mode to target operating mode, and executing the SMI handler under the target operating mode. The address of the state save area, the address of the core configuration information memory space, and the address of the SMI handler can be determined directly. Each logical core may enter the target operating mode directly through hardware setting every time after entering the SMM, and thus does not need to perform a fixed operation of mode switching when executing the SMI handler, which may improve the execution efficiency of the SMI handler.

33 Claims, 16 Drawing Sheets

(56) References Cited

U.S. PATENT DOCUMENTS

| | | | |
|---|---|---|---|
| 2014/0232870 A1* | 8/2014 | Mondal | H04N 7/183 348/148 |
| 2014/0274305 A1* | 9/2014 | Shimabukuro | G07F 17/3241 463/24 |
| 2015/0143089 A1* | 5/2015 | Lewis | G06F 9/4812 710/267 |
| 2016/0282927 A1 | 9/2016 | Adams | |
| 2019/0156015 A1* | 5/2019 | Brannock | G06F 9/468 |
| 2022/0206811 A1* | 6/2022 | Wang | G06F 9/45516 |
| 2023/0099517 A1 | 3/2023 | Neiger | |
| 2024/0320002 A1* | 9/2024 | Lawlor | G06F 12/02 |

FOREIGN PATENT DOCUMENTS

| | | |
|---|---|---|
| CN | 105446900 A | 3/2016 |
| CN | 111796939 A | 10/2020 |
| CN | 114691205 A | 7/2022 |

OTHER PUBLICATIONS

English language translation of office action dated Jan. 5, 2024.

* cited by examiner

METHOD FOR ENTERING SYSTEM MANAGEMENT MODE, PROCESSOR, AND COMPUTER SYSTEM

CROSS REFERENCE TO RELATED APPLICATIONS

This application claims priority of China Patent Application No. 202311628148.5, filed on Nov. 30, 2023, the entirety of which is incorporated by reference herein.

BACKGROUND OF THE INVENTION

Field of the Invention

The present disclosure relates to the technical field of system management modes, and in particular, it relates to a method for a processor and computer system to enter system management mode.

Description of the Related Art

System management mode (SMM) is a special operating mode of a processor. It is usually used to implement system-level functions, such as system monitoring, power management, error handling, or the private customized functions of an Original Equipment Manufacturer (OEM). However, after entering the SMM, the processor will first enter a real mode, and after switching from the real mode to a 64 bit mode, the system management interrupt handler may then be executed normally. This affects the efficiency of execution.

BRIEF SUMMARY OF THE INVENTION

In view of the present disclosure, a method for entering system management mode (SMM), a processor, and a computer system is provided.

According to an aspect of the present disclosure, a method for entering the SMM is provided. The method is applied to the logical cores of the processor, which includes at least one logical core, and the method comprises: entering the SMM in response to system management interrupt (SMI); storing current state information to a corresponding state save area; setting operating mode to a target operating mode; and executing an SMI handler while in the target operating mode, wherein a mode switch is not performed when executing the SMI handler.

According to another aspect of the present disclosure, a processor is provided. The processor comprises at least one logical core, the logical cores are configured to execute response execution steps after the execution of initialization settings, and the response execution steps include: entering the SMM in response to the SMI; storing the current state information to the corresponding state save area; setting the operating mode to the target operating mode; and executing the SMI handler while in the target operating mode, wherein a mode switch is not performed when executing the SMI handler.

According to another aspect of the present disclosure, a computer system is provided. The computer system comprises: a processor including at least one logical core and at least one model specific register (MSR); a memory; wherein the logical cores are configured to execute the response execution steps after the execution of the initialization settings, and the response execution steps include: storing the current state information to the corresponding state save area; setting the operating mode to the target operating mode; executing the SMI handler while in the target operating mode, wherein a mode switch is not performed when executing the SMI handler.

Through the method for entering the SMM, the processor, and the computer system provided by embodiments of the present disclosure, every time after entering the SMM, each of the logical cores may enter target operating mode directly through hardware setting according to the mode setting information included in the core configuration information. Each of the logical cores does not need to perform a fixed operation of mode switching, thus may improve the execution efficiency of the SMI handler. Additionally, the core configuration information can be customized (e.g., the general purpose register can be customized) according to actual needs, which reduce the setting operations when executing the SMI handler in order to further improve the execution efficiency of the SMI handler.

Other features and aspects of the present disclosure will become apparent from the following detailed description of exemplary embodiments with reference to the accompanying drawings.

BRIEF DESCRIPTION OF DRAWINGS

The accompanying drawings incorporated in and constitute a part of the specification illustrate exemplary embodiments, features, and aspects of the present disclosure and together with the description serve to explain the principles of the disclosure.

DETAILED DESCRIPTION OF THE INVENTION

Figure 1:
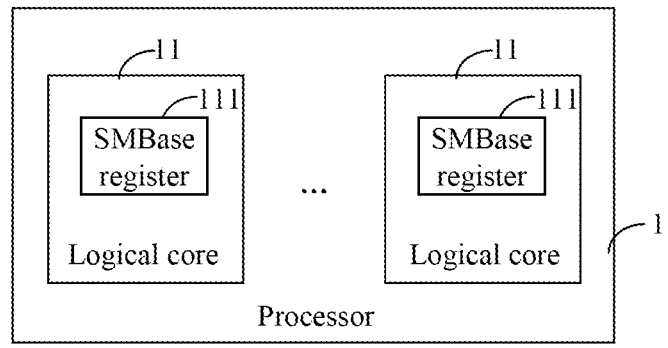
FIG. 1 shows a block diagram of a processor applied by a method for entering system management mode (SMM) according to an embodiment of the present disclosure.

Various exemplary embodiments, features and aspects of the present disclosure will be described in detail below with reference to the accompanying drawings. The same reference in the drawings identify functionally identical or similar elements. Although various aspects of the embodiments are illustrated in the drawings, the drawings are not necessarily drawn to scale unless otherwise indicated.

As used herein, the term "exemplary" means "serving as an example, embodiment, or illustrative". Any embodiment described herein as "exemplary" is not necessarily to be construed as superior or better to other embodiments.

In addition, in order to better explain the present disclosure, numerous specific details are given in the following detailed description. It will be understood by those skilled in the art that the present disclosure may be implemented without certain specific details. In some instances, methods, means, components and circuits that are well known to those skilled in the art are not described in detail in order to emphasize the subject matter of the present disclosure.

Figure 3:
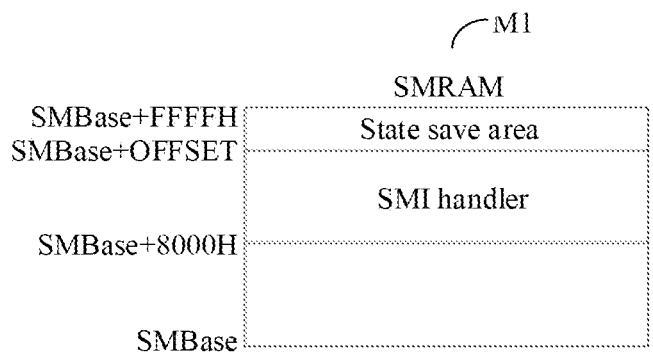
FIG. 3 shows a schematic diagram of a system management random access memory (SMRAM) in the method for entering the SMM according to an embodiment of the present disclosure.

The present disclosure provides a method for entering a system management mode, and FIG. 1 shows a block diagram of a processor for the method for entering the system management mode according to an embodiment of the present disclosure. The method is applied to a processor 1 in FIG. 1, the processor 1 may include one or more logical cores 11. In the processor 1, a system management memory base address (SMBase) register 111 is located inside each of the logical cores 11. The SMBase register 111 is used to store base addresses of a system management random access memory (SMRAM) M1 as shown in FIG. 3 that correspond to the logical cores 11.

Figure 2:
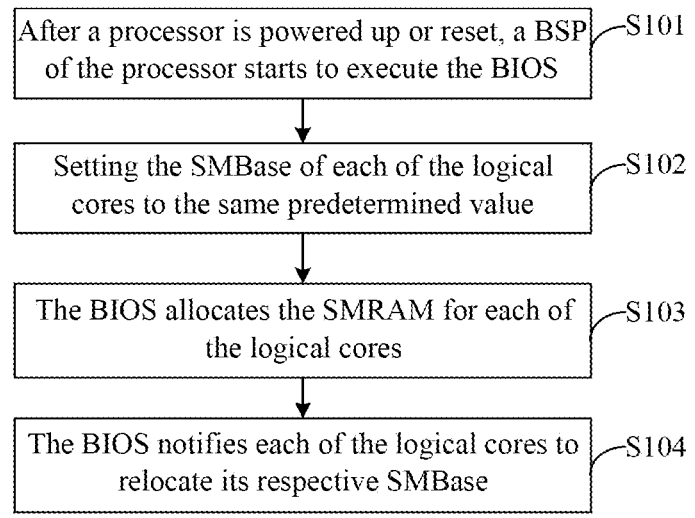
FIG. 2 shows a flow chart of initialization settings before entering the SMM according to an embodiment of the present disclosure.

FIG. 2 shows a flow chart of initialization settings before entering the system management mode according to an embodiment of the present disclosure. As shown in FIG. 2, the method needs to perform the initialization settings before entering the system management mode, wherein the initialization settings may include steps S101-S104.

In step S101, after the processor is powered on or reset, a BootStrap Processor (BSP) of the processor starts to execute the Basic Input/Output System (BIOS). In one embodiment, the processor 1 may include at least one core, each core includes at least one logical core 11. One of the logical cores 11 in the processor 1 may be configured to be a BSP.

In step S102, the SMBase of each of the logical cores of the processor is set to the same predetermined value. For example, the SMBase of each of the logical cores are set to the same predetermined value of 30000H (hexadecimal number, the same below), but the present disclosure is not limit thereto.

FIG. 3 shows a schematic diagram of a SMRAM in the method for entering the system management mode according to an embodiment of the present disclosure. As shown in FIG. 3, since all of the SMRAM of the logical cores are in the same memory (e.g., the system memory of a computer system, or an independent memory independent from the system memory), if the SMRAM of each of the logical cores is set to the same predetermined value, the state save area of each of the logical cores 11 will overlap (i.e., the state save areas of all of the logical cores 11 occupy the same memory address range). If two or more logical cores 11 enter the system management mode (SMM) at the same time, the state information (also referred to as context, including the value of each of the general purpose register (such as RAX, RBX, RCX, RDX, etc.) and so on) of the previous logical core 11 that stores in the state save area will be overwritten by the logical core 11 that enters the SMM later, causing the previous logical core 11 unable to exit the SMM normally. Thus, to ensure that the two or more logical cores 11 can exit the SMM normally after entering the SMM simultaneously, the BIOS must relocate the SMBase of each of the logical cores 11 to a proper location. Each of the logical cores 11 can relocate its SMBase by modifying the value of the SMBase register 111 only after the logical cores 11 has entered the SMM. Also, due to the reasons mentioned above, each of the logical cores 11 can only enter the SMM sequentially (i.e., serially) to relocate its SMBase (i.e., to perform the following steps S103 and S104).

In step S103, the BIOS allocates the SMRAM M1 as shown in FIG. 3 for each of the logical cores 11. The base addresses of the SMRAM M1 of different logical cores 11 are different.

As shown in FIG. 3, the SMRAM M1 of each of the logical cores 11 is configured as a fixed structure, wherein the memory space between SMBase~SMBase+8000H is free. In the SMRAM M1, the memory space from SMBase+ 8000H is configured to store the system management interrupt handler (SMI handler). The state save area is located in the memory space corresponds to SMBase+OFFSET~SM- Base+FFFFH, and is configured to save the state information of the logical core 11 before the logical core 11 enters the SMM. OFFSET is a hexadecimal number greater than 8000H and less than FFFFH. In an embodiment, OFFSET is FE00H. In another embodiment, OFFSET is FC00H.

In step S104, the BIOS notifies each of the logical cores 11 to relocate its respective SMBase. Specifically, the BIOS sends the system management interrupt (SMI) to each of the logical cores 11 sequentially so that each of the logical cores enters the SMM. Then, the BIOS will write the start address of the SMRAM M1 allocated in step S103 into the SMBase register. After a logical core 11 completes the relocation of its SMBase, the BIOS will notify the next logical core 11 to perform the relocation of its SMBase, i.e., this process is in serial and inefficient.

In this way, through steps S101-S104, the BSP implements the relocation of the SMBase of each of the logical cores 11 through the BIOS. This ensures that each of the subsequent logical cores 11 may respond to the SMI at the same time. However, since each of the logical cores 11 has to enter the SMM serially to relocate the SMBase, the initialization setting process of the SMM is inefficient.

Figure 4:
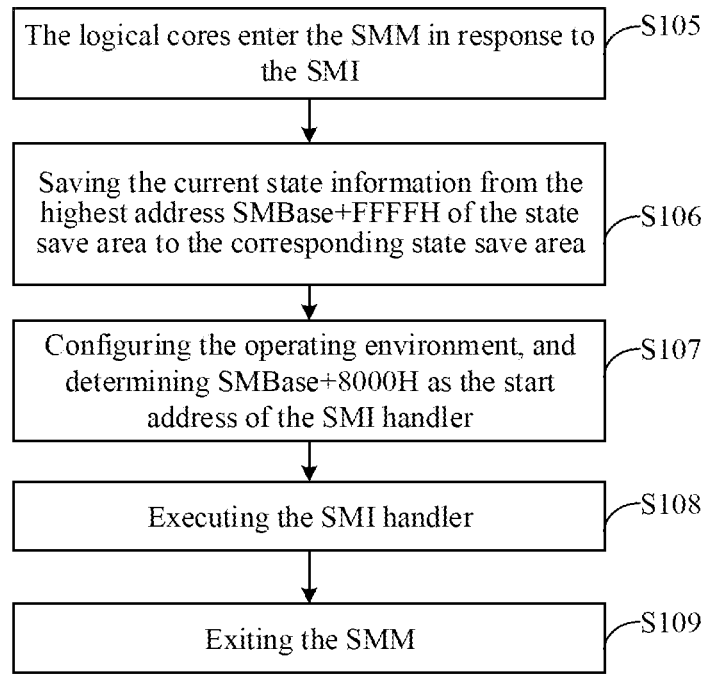
FIG. 4 shows a flow chart of the method for entering the SMM according to an embodiment of the present disclosure.

FIG. 4 shows a flow chart of the method for entering the SMM according to an embodiment of the present disclosure. As shown in FIG. 4, the method for entering the SMM is also referred to as response execution steps (i.e., the steps of processing the SMI), which include steps S105-S109. The following takes one logical core as an example to illustrate how the logical core 11 handles the SMI with FIG. 4.

In step S105, the logical core enters the system management mode in response to the SMI.

In step S106, the logical core determines the address range (SMBase+OFFSET~SMBase+FFFFH) of the corresponding state save area based on the SMBase, then saves the current state information of the logical core from the highest address (for example, SMBase+FFFFH) to the corresponding state save area (i.e., save the current state information from the highest address to the lower address).

In step S107, the logical core loads the required information for configuring the operating environment to configure the operating environment, and determines SMBase+8000H as the entrance to the SMI handler (i.e., SMBase+8000H is the start address of the memory space of the SMI handler). In some embodiments, configuring the operating environment may indicates the configuration of the value of each of the corresponding registers as shown in the Table 1 below. The operating mode of the logical core can be set to a real mode by setting the PE, EM, TS, and PG bits of the CR0 register to 0.

TABLE 1

Settings of Register Configurations

| Register | Contents |
| --- | --- |
| General purpose registers | Undefined (i.e., the value saved in the general purpose register is undetermined) |
| EFLAGS | 00000002H |
| EIP | 00008000H |
| CS selector | Right shift 4 bits of SMBase (3000H by default) |
| CS base | SMBase (predetermined as 30000H) |
| DS, ES, FS, GS, SS selectors | 0000H |
| DS, ES, FS, GS, SS base | 000000000H |
| DS, ES, FS, GS, SS limits | 0FFFFFFFFH |

TABLE 1-continued

Settings of Register Configurations

| Register | Contents |
| --- | --- |
| CR0 | PE, EM, TS, and PG bits set to 0; others remain as origin |
| CR4 | Clear to 0 |
| CR6 | Undefined (i.e., the value saved in the CR6 is undetermined) |
| CR7 | 00000400H |

In step S108, the logical core starts executing SMI handler. In the SMI handler, the logical core is first switched from the real mode to a target operating mode (e.g., 64 bit mode), and execute the remaining parts of codes of the SMI handler while in the target operating mode (e.g., 64 bit mode). Due to the need of mode switching, the efficiency of the execution of the SMI handler is reduced. In addition, as shown in Table 1, since the values of some of the registers are undefined (e.g., the value of the general purpose registers), before executing the remaining parts of codes of the SMI handler, it is needed to load the required values into the registers. This also reduces the execution efficiency of the SMI handler.

In step S109, the logical core execute RSM instruction at the end of the SMI handler to exit the SMM. Specifically, the logical core restores the state information that is saved in the state save area (for example, write the value of each of the registers that is saved in the state save area back to each of the registers) in response to the RSM instruction, and exits the SMM. Then, the logical core continues to execute the process that the logical core was executing before receiving the SMI.

It should be notified that the above steps S105-S107 are implemented by the hardware of the logical core, and the above steps S108-S109 are implemented through executing the SMI handler.

As set forth above, the methods shown in FIG. 1 to FIG. 4 may implement the normal execution of the SMI handler, but there are the problems as followed:

Problem 1:

Since the SMBase of each of the logical cores has the same predetermined value under initial conditions, in order to ensure that each of the logical cores can respond to the SMI simultaneously, it is required to relocate the SMBase for each of the logical cores by executing steps S101-S104. However, relocating the SMBase of each of the logical cores can only be executed serially for each of the logical cores, and thus is very time consuming. Moreover, since the SMRAM M1 in FIG. 3 only defines the usage of the top (i.e., the address less than SMBase+FFFFH) and the middle (i.e., the address higher than SMBase+8000H) of the SMRAM, and does not define the usage of the bottom (i.e., the address less than SMBase+8000H) of the SMRAM, this may easily cause memory fragmentation (for example, the bottom of the SMRAM may not be used) and makes the codes for memory management while in the SMM more complicated.

Problem 2:

Each of the logical cores will be set to the real mode by the hardware of the logical cores after entering the SMM. However, since some codes of the SMI handler can be executed only while in the target operating mode (e.g., 64 bit mode), the SMI handler has to switch the operating mode to the target operating mode (e.g., 64 bit mode). This causes the SMI handler to execute a fixed operation of switching from the real mode to the target operating mode every time the SMI handler is executed, which reduces the execution efficiency of the SMI handler.

Problem 3:

As shown in Table 1, after entering the SMM, the values of some registers (e.g., the general purpose registers) are undefined (i.e., undetermined). It is needed to load the required values into these registers every time before executing the SMI handler. This also reduce the execution efficiency of the SMI handler.

Figure 5:
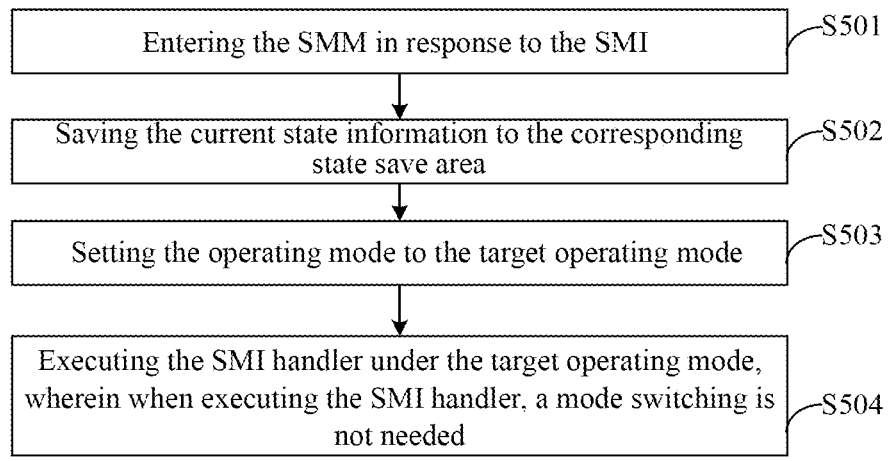
FIG. 5 shows a flow chart of the method for entering the SMM according to an embodiment of the present disclosure.

To solve the above technical problems, embodiments of the present disclosure also provides a method for entering the system management mode. FIG. 5 shows a flow chart of the method for entering the SMM according to an embodiment of the present disclosure. The method can be applied to a processor, while the processor includes at least one logical core. In some embodiments, the processor may include at least one core, each of the cores includes at least one logical core. The method for entering the SMM is executed after the processor completes the initialization settings of the SMM, and the method can be referred to as the response execution steps. The response execution steps execute SMI handler in response to the SMI.

As shown in FIG. 5, the response execution steps (i.e., the method of entering the system management mode) may include steps S501-S504.

In step S501, enters the SMM in response to the SMI.

In step S502, the current state information is saved to the corresponding state save area.

In step S503, the operating mode is set to the target operating mode. The target operating mode may be 64 bit mode, 32 bit mode, etc., and the present disclosure is not limit thereto.

In step S504, the SMI handler is executed while in the target operating mode, wherein no mode switching occurs during the execution of the SMI handler.

Steps S501-S503 are implemented by the hardware of the processor, and step S504 is implemented through executing the SMI handler.

In a possible implementation, the processor may also include at least one model specific register (MSR) (such as a first MSR, a second MSR, a third MSR, a fourth MSR, and a fifth MSR described below). Each of the MSRs saves addresses associated with the SMRAM of the logical cores, so that the logical cores can preset the logical cores based on the related address saved in the MSR. The preset includes setting the operating mode to the target operating mode, and setting the operating environment of the logical cores. In an embodiment, the core configuration information required for the preset will be predetermined in the SMRAM. The start address of the memory space for saving the core configuration information can be determined through at least one MSR. When the logical cores read and/or write the MSR, there is no need to enter the SMM. Therefore, each of the logical cores may execute step S503 in parallel, which means a higher efficiency.

In some embodiments, the hardware of the logical cores (e.g., interrupt processing unit) first reads the core configuration information from the corresponding area of the SMRAM according to the address saved in at least one MSR. Then, the hardware of the logical cores performs the preset according to the core configuration information. For example, the operating mode of the logical cores may be set to 64 bit mode (the specific settings will be described in the following). In another embodiment, the core configuration information is predetermined directly in the hardware of the logical cores (e.g., interrupt processing unit), and the hardware of the logical cores (e.g., interrupt processing unit) performs the preset on the logical cores directly according to the predetermined core configuration information.

In this implementation, the SMRAM includes the core configuration information memory space for saving the core configuration information. The method further includes: determines the address of the corresponding core configuration information memory space of the logical cores according to the address saved in at least one MSR, in which the core configuration information includes mode setting information, and the mode setting information can indicate the setting value of each of the registers corresponds to the target operating mode; and sets each of the registers corresponds to the target operating mode based on the mode setting information.

In this implementation, the target operating mode includes 64 bit mode, and the registers that correspond to the 64 bit mode include one or more of the following: CR0 register, CR3 register, CR4 register, EFER register, segment register, and CS register; the segment register includes at least one DS register, ES register, ES register, FS register, and GS register. The setting value of the PG bit and the PE bit of the CR0 register are both 1, and the CR3 register indicates the address of the page in which the SMM is located; the CR4 register indicates the basic configuration information of the processor; the setting value of the LME bit of the EFER register is 1; the setting value of the L bit of the CS register is 1, which indicates that the 64 bit mode is enabled.

In this implementation, the core configuration information includes: mode setting information, wherein the mode setting information is for indicating the target operating mode that the logical cores have to enter, and the target operating mode includes 64 bit mode.

In this implementation, the SMRAM includes state save areas, wherein the method further includes: determines the address of the corresponding state save area of the logical cores according to the address saved in at least one MSR. Specifically, the logical cores determine the address of the state save area of the SMRAM according to the address saved in at least one MSR. Then, the logical cores save the current state information to the state save area of the corresponding SMRAM. For example, the logical cores may write the value of the structure registers to the state save area of the SMRAM, etc. The structure registers include the general purpose registers (such as RAX, RBX, RCX, and RDX, etc.) and segment registers (such as CS, DS, and SS, etc.), etc.

In this implementation, the core configuration information includes the operating environment information, which can indicate the setting value of each of the registers of the logical cores corresponding to the operating environment. The method further includes: determines the address of the corresponding core configuration information memory space of the logical cores according to the address saved in at least one MSR; and sets each of the registers corresponding to the operating environment based on the operating environment information.

In this implementation, the core configuration information further includes the address of the SMI handler.

In this implementation, the SMRAM may further include: handler memory space for storing the SMI handler. At least one MSR stores the address of the handler memory space, etc.

Through the above method for entering the system management mode, the address of the state save area, the address of the core configuration information memory space, and the address of the SMI handler can be determined directly according to said MSR. The mode setting information included in the core configuration information makes each of the logical cores enter target operating mode directly through the hardware setting every time after entering the SMM. Executing the SMI handler without going through a fixed operation of mode switching can increase the execution efficiency of the SMI handler. Additionally, the settings of the core configuration information can be customized (e.g., customize the settings of the general purpose registers) according to practical requirement in order to reduce the set operations when executing the SMI handler, and to further increase the efficiency of the execution of the SMI handler. For example, the identification of each of the logical cores can be written into the general purpose registers (e.g., RAX) according to the core configuration information. In this way, the SMI handler may read the identification of the corresponding logical core directly from the general purpose registers, and do not need to obtain the identification through execution instructions (e.g., CPUID instructions). Therefore, this increases the efficiency of executing the SMI handler.

In order to implement the above-mentioned method in FIG. 5, each step of the method and the processor that executes the method can be set according to actual needs. The present disclosure uses several schematic examples below to illustrate possible implementations of the method for entering the system management mode (i.e., the response execution steps) and the initialization steps that the processor has to perform before performing the method for entering the SMM.

Example 1 (Described Below with Reference to
FIG. 6-FIG. 10)

Figure 6:
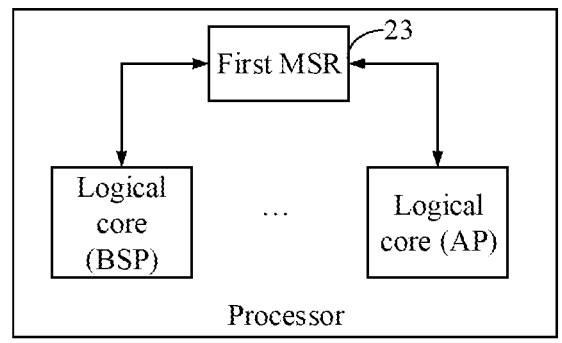
FIG. 6 shows a block diagram of the processor applied by Example 1 according to an embodiment of the present disclosure.

FIG. 6 shows a flow chart of a processor applied to the Example 1 according to an embodiment of the present disclosure. As shown in FIG. 6, the method may be applied to the processor as shown in FIG. 6. The processor includes a plurality of logical cores and a first MSR 23. The logical cores include a first logical core and at least one second logical core, wherein the first logical core can be the bootstrap processor (BSP) and the second logical core can be the application processor (AP). For simplicity, FIG. 6 only schematically shows that the processor includes two logical cores, BSP and AP, respectively. In an embodiment, the first MSR 23 is configured in an uncore (e.g., the interconnection structure between cores) of the processor.

Figure 7:
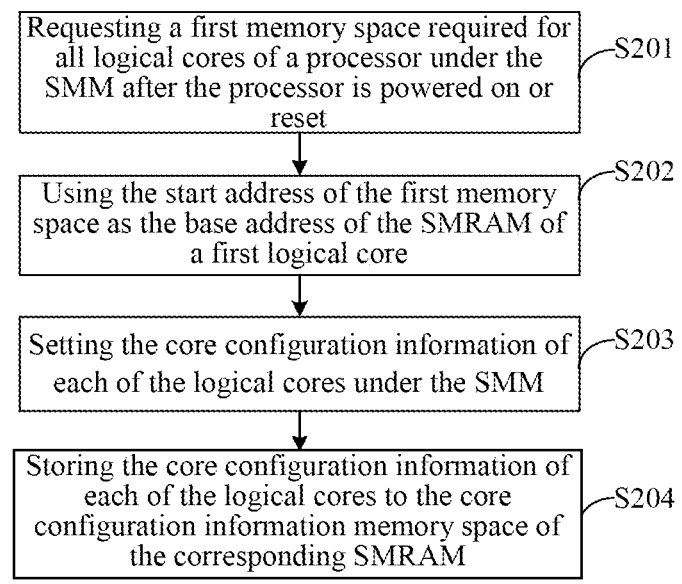
FIG. 7 shows a flow chart of the initialization settings in Example 1 according to an embodiment of the present disclosure.

FIG. 7 shows a flow chart of initialization settings of Example 1 according to an embodiment of the present disclosure, which can be applied to the processor as shown in FIG. 6. As shown in FIG. 7, the initialization settings in the method may include steps S201-S204.

Figure 8:
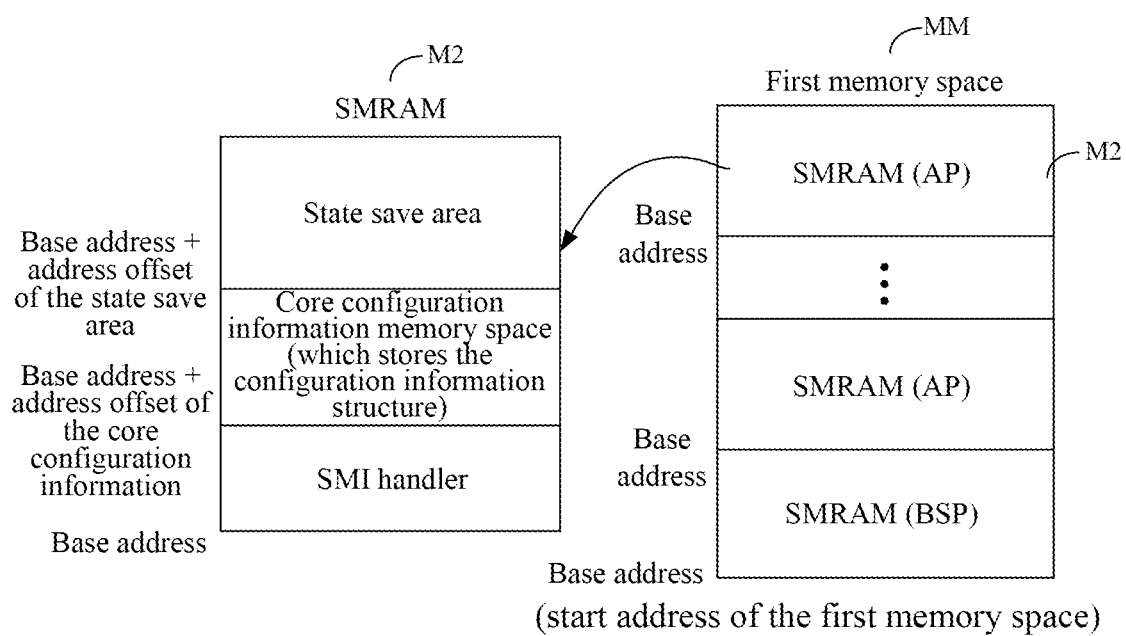
FIG. 8 shows a schematic diagram of the SMRAM and a first memory space in Example 1 according to an embodiment of the present disclosure.

In step S201, after the processor is powered on or reset, the first logical core of the processor execute the BIOS to request a first memory space MM as shown in FIG. 8, which is continuous and necessary while in the SMM for all logical cores. The first memory space MM is a continuous memory space, and is configured as a SMRAM M2 for each of the logical cores of the processor. The first memory space MM (and the first memory space described below) may be allocated from the system memory or the independent memory that is independent from the system memory that can only be accessed while in the SMM.

FIG. 8 shows a schematic diagram of the first memory space and the SMRAM in the Example 1 according to an embodiment of the present disclosure. As shown in FIG. 8, in the initialization settings, each logical core may be allocated a SMRAM M2 as shown in FIG. 8, and the SMRAM M2 of each logical core has the same predetermined SMRAM size (e.g., 64K bytes). During the process of requesting the first memory space, the product of the predetermined SMRAM size and the number of the logical cores may be configured as the size of the first memory space MM to be allocated.

In step S202, the first logical core executes the BIOS to use the start address of the first memory space MM as the base address of the SMRAM M2 of the first logical core, and saves the base address of the corresponding SMRAM M2 of the first logical core to the first MSR 23. The first logical core can write/read (by using the instruction WRMSR/RDMSR) the base address of the corresponding SMRAM M2 into/from the first MSR 23. The second logical core can read (by using the instruction RDMSR) the base address of the corresponding SMRAM M2 from the first MSR 23. The first MSR can be a 64 bit Model Specific Register.

In this embodiment, as shown in FIG. 8, in the corresponding SMRAM M2 of each of the logical cores: the base address of the SMRAM M2 allocated to each of the logical cores is the address of the SMI handler (i.e., the base address of the SMRAM M2 is the start address of the SMI handler), the memory space corresponding to the preset address offset of the core configuration information is the core configuration information memory space for storing the core configuration information of the logical cores, and the memory space that corresponds to the preset address offset of the state save area is the state save area of the logical cores. The base address of the SMRAM M2 of the first logical core is the base address that stored in the first MSR as mentioned above, and the base address of the SMRAM M2 of the second logical core is "determined by the association between the base address of the corresponding SMRAM M2 of the first logical core and the base address of the corresponding SMRAM M2 of the second logical core." The associations between the base addresses of different second logical cores and first logical cores are different.

In some embodiments, the associations of addresses may be determined according to the identification (e.g., the Advanced Programmable Interrupt Controller ID (APIC_ID)) of the logical cores can be configured as the identification of the logical cores) and the size of the SMRAM M2 of each of the logical cores. Assuming the base address corresponds to the first logical core is BSP_SMM_BASE and the size of the SMRAM M2 of each of the logical cores is the same (e.g., 64K bytes), the corresponding base address of a certain second logical core can be determined to be BSP_SMM_BASE+APIC_ID×delta according to the base address association, wherein "delta" is the size of the SMRAM M2 of each of the logical cores. The value of the APIC_ID of the first logical core is 0, the value of the APIC_ID of the first second logical core is 1, the value of the APIC_ID of the second second logical core is 2, etc., and so on.

In some embodiments, the address offset of the core configuration information and the address offset of the state save area are relative to the address offset of the SMRAM M2 of the corresponding logical cores, and the present disclosure is not limit thereto.

In step S203, the first logical core executes the BIOS to set the core configuration information of each of the logical cores in the SMM. In some embodiments, the core configuration information includes a plurality of information fields, each of the information fields is configured to store the corresponding core configuration information or the memory address of the corresponding core configuration information. In this embodiment, the core configuration information includes the mode setting information corresponds to the target operating mode that is required for mode setting before the logical cores execute the SMI handler, and the operating environment information required for environment setting before the logical cores execute the SMI handler. Accordingly, the logical cores may set the operating mode of the logical cores to the target operating mode based on the mode setting information, and set the operating environment based on the operating environment information. In some embodiments, the target operating mode may be a 64 bit mode, a 32 bit mode, etc., and the present disclosure is not limit thereto. The operating environment information can indicate the value of each of the registers (e.g., each of the general purpose registers RAX, RBX, RCX, and RDX, etc.) corresponds to the operating environment while in the SMM. The mode setting information can indicate the value of each of the registers corresponds to the target operating mode.

In some embodiments, the core configuration information may also include at least one mode control information, access control information, and interrupt legality information. The mode control information is configured to indicate the target operating mode that the logical cores have to enter. The access control information is configured to indicate the access authority to target resources, wherein the target resources include one or more of the following: IO ports, registers, PCI devices, memory space and other resources that the logical cores can access, and the present disclosure is not limit thereto. In some embodiments, the interrupt legality information may be implemented in the form of a software SMI whitelist.

In step S204, the first logical core executes the BIOS to notify each of the logical cores to store its core configuration information to its core configuration information memory space corresponds to each logical core as shown in FIG. 8. The corresponding address of the core configuration information memory space of each of the logical cores is determined by the base address of the SMRAM M2 of the first logical core. For example, the aforementioned formula BSP_SMM_BASE+APIC_ID×delta may be configured to calculate the base address of the corresponding SMRAM M2 of the logical core. Then, the base address of the corresponding SMRAM M2 of the logical core is added with the address offset of the core configuration information to obtain the corresponding address of the core configuration information memory space of the logical cores.

Figure 9:
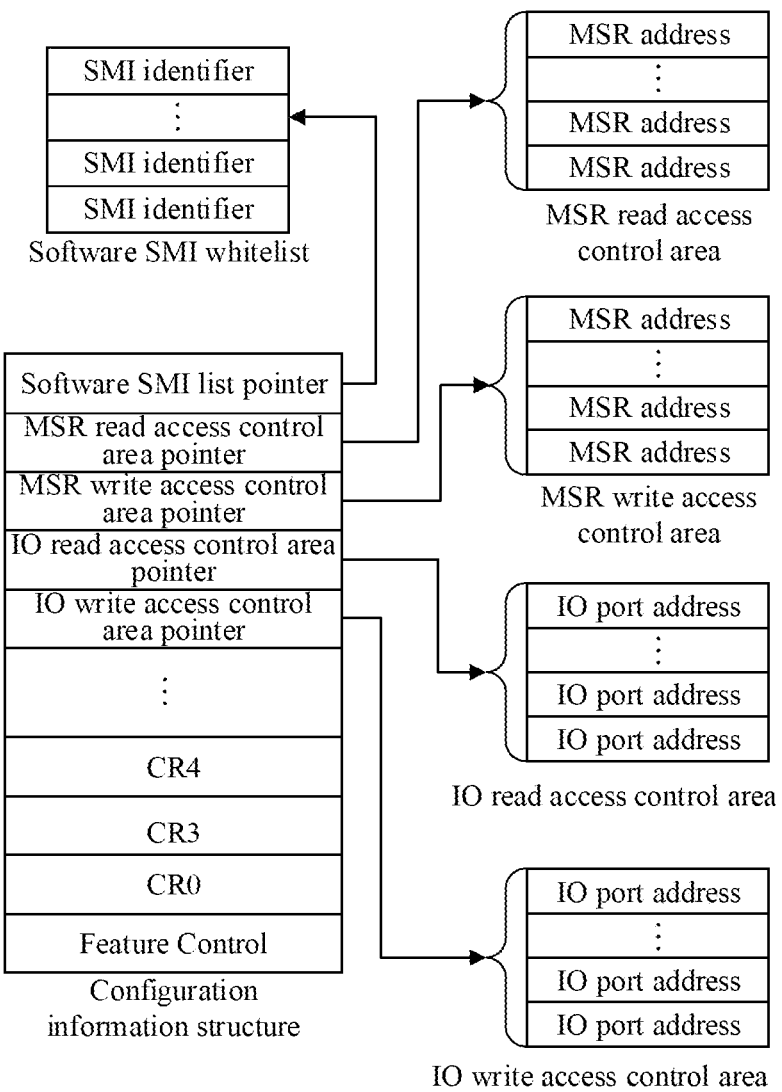
FIG. 9 shows a schematic diagram of a configuration information structure according to an embodiment of the present disclosure.

FIG. 9 shows a schematic diagram of the configuration information structure of an embodiment of the present disclosure. In some embodiments, the configuration information structure (SMM_ENTRY_STRUCT) may include a plurality of information fields that are set in sequence in FIG. 9. As shown in FIG. 9, each of the information fields of the configuration information structure may directly store the corresponding core configuration information, such as the stored setting values of CR0, CR3, CR4, and other registers. Each of the information fields of the configuration information structure may also store the address indicating where the corresponding core configuration information should be stored (i.e., a pointer) to implement the resource access control in the SMM to improve system security. For example, the IO write access control area pointer and the IO read access control area pointer are set for the IO port access control, the MSR read access control area pointer and the MSR write access control area pointer are set for the access control of the MSR, and the software SMI list pointer is set for the interrupt legality information.

In some embodiments, each of the pointers in the configuration information structure (IO write access control area pointer, IO read access control area pointer, MSR read access control area pointer, MSR write access control area pointer, and software SMI list pointer) can be stored in the corresponding field according to the configured structure. As shown in FIG. 9, each of the pointers may indicate a memory space.

As shown in FIG. 9, the memory spaces "IO write access control area" and "IO read access control area", which are indicated by the IO write access control area pointer and the IO read access control area pointer respectively, store at least one IO port address. The logical cores are not allowed to write data to the IO port corresponds to the address of each of the IO ports in the IO write access control area. The logical cores are not allowed to read data from the IO port corresponds to the address of each IO port in the IO read access control area.

As shown in FIG. 9, the MSR write access control area pointer and the MSR read access control area pointer point respectively to the memory spaces "MSR write access control area" and "MSR read access control area", where at least one MSR address is stored. The logical cores are not allowed to write data to the corresponding MSR of each of the MSR addresses in the MSR write access control area. The logical cores are not allowed to read data from the corresponding MSR of each of the MSR addresses in the MSR read access control area.

As shown in FIG. 9, the memory space indicated by the software SMI list pointer stores the software SMI whitelist. The software SMI whitelist includes at least one SMI identifier, wherein the SMI identifier is configured to indicate a corresponding SMI. According to the SMI identifier, the legality of the SMI handler may be determined before executing the SMI handler, which saves the processing time and improves system security. In an embodiment, the SMI identifier is an 8-bit number that can be written into the port register by the software which triggers the SMI. The SMI handler can read the SMI identifier and use it to determine which software triggers the SMI.

In some embodiments, as shown in FIG. 9, the length of each of the information fields of the configuration information structure may be a predetermined length, such as 32 bits or 64 bits. The configuration information structure also includes Feature Control information fields. The Feature Control information fields are configured to set some specific functions necessary after entering the system management mode. For example, whether to support mode switching control, whether to support access control (i.e., whether to support the control based on IO write access control area pointer, IO read access control area pointer, MSR write access control area pointer, MSR read access control area pointer, software SMI list pointer, etc.), etc., can be set through the Feature Control information fields.

For example, if the target operating mode is the 64 bit mode, the core configuration information may be set according to the following:
  CR0: the PG bit of CR0 register is set to 1, which enables paging by default; the PE bit of CR0 register is set to 1, which enables the protection mode by default.
  CR3: points to the address of the page in which the SMI handler is located.
  CR4: includes the basic allocation of some processors, such as allocating the page types through setting the Physical Address Extensions (PAE) bit of CR4 register.
  EFER: the LME bit of EFER register is set to 1, which enables IA32-e mode.

Segment registers DS/ES/FS/GS, etc., are set to 0.

CS: the L bit of CS register is set to 1, which enables the 64 bit mode.

Loads the above-mentioned core configuration information into the register corresponds to the logical core, so that the logical core may be in 64 bit mode as soon as it enters the SMM, and do not need to perform the mode switching from real mode to 64 bit mode when executing the SMI handler. This may improve the execution efficiency of the SMI handler.

In conclusion, the initialization settings provided by Example 1 through FIG. 6 to FIG. 9 do not need to set the base address of the SMRAM M2 of each of the logical cores serially. This shortens the time and improves the execution efficiency of the initialization settings. The mode setting information included in the core configuration information makes each of the logical cores enters target operating mode directly through hardware settings every time after entering the SMM. Therefore, there is no need to perform a fixed operation of mode switching when executing SMI handler, which improves the execution efficiency of the execution of the SMI handler. Further, the core configuration information can be customized (e.g., the general purpose registers can be customized) to meet practical needs, which reduces the setting operations when executing the SMI handler in order to improve the execution efficiency of the SMI handler.

Figure 10:
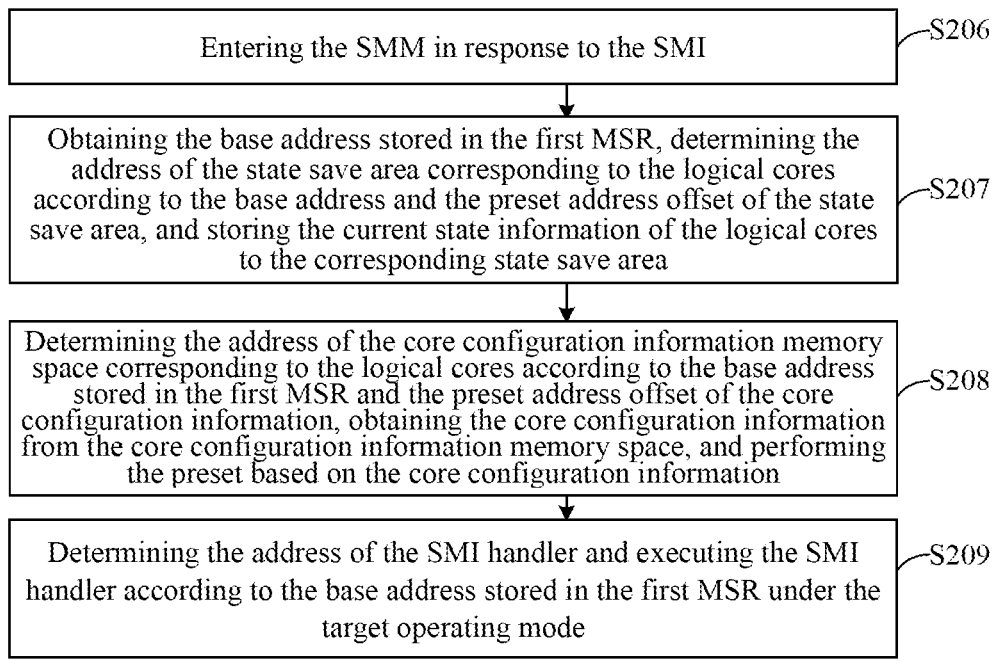
FIG. 10 shows a flow chart of the method for entering the SMM in Example 1 according to an embodiment of the present disclosure.

FIG. 10 shows a flow chart of the method for entering the system management mode in Example 1 according to an embodiment of the present disclosure. After the initialization settings of the SMRAM are finished, any one of the logical cores in the processor shown in FIG. 6 can now process the system management interrupt (SMI). The response execution steps shown in FIG. 10 are the specific flow for logical cores executing the SMI, in which the response execution steps may be executed by any one of the logical cores in the processor shown in FIG. 6, and the processor may have one or more logical cores processing the response execution steps simultaneously. As shown in FIG. 10, the response execution steps may include steps S206-S209. Steps S206-S208 are implemented by the hardware of the logical cores, while step S209 is implemented by the logical cores through the execution of the SMI handler.

In step S206, the logical cores enter the system management mode (SMM) in response to the SMI. Step S206 is the same as step S105 in FIG. 4, thus will not be described here again. Then, step S207 is executed.

In step S207, the logical cores obtain the stored base address (i.e., the base address BSP_SMM_BASE of the SMRAM M2 of the first logical core) from the first MSR. Next, the address of the corresponding state save area of the logical core is determined according to the base address, and saves the current state information of the logical core to the corresponding state save area of the logical core. The state information may indicate the current operation status and environment of the logical cores, such as context, etc., in which the context may include the value of each of the registers (e.g., RAX, RBX, RCX, RDX, etc.), and the present disclosure is not limit thereto.

The methods for the first logical core and the second logical core to determine the address of the corresponding state save area based on their respective base address stored in the first MSR are different. After the first logical core obtains the base address from the first MSR, as shown in FIG. 8, since the base address of the SMRAM M2 that corresponds to the first logical core is stored in the first MSR, the first logical core may add the base address and the preset address offset of the state save area to obtain the address of the state save area of the first logical core. After obtaining the base address from the first MSR, the second logical core determines its base address of the SMRAM M2 according to the association between the base address of the corresponding SMRAM M2 of the second logical core and the base address of the corresponding SMRAM M2 of the first logical core in the first MSR. Next, the base address of the corresponding SMRAM M2 and the address offset of the state save area of the second logical core may be added to obtain the address of the state save area corresponds to the second logical core. The above has mentioned how to calculate the base address of the SMRAM corresponds to the logical cores, and how to further calculate the address of the state save area of the logical cores according to the formula BSP_SMM_BACE+APIC_ID×delta. This will not be described again here.

In step S208, the logical core determines the address of the core configuration information memory space of the SMRAM M2 corresponds to the logical core according to the base address in the first MSR, obtains the core configuration information from the core configuration information memory space, and performs the preset based on the obtained core configuration information.

The methods for the first logical core and the second logical core to determine the address of the corresponding core configuration information memory space based on their respective base address stored in the first MSR are different. After obtaining the base address from the first MSR, as shown in FIG. 8, the first logical core may add the base address and the address offset of the core configuration information directly to obtain the address of the core configuration information memory space of the first logical core. The second logical core may determine the base address of its corresponding SMRAM M2 in the above-mentioned step 207, then add the base address and the address offset of the core configuration information to obtain the address of the core configuration information memory space corresponds to the second logical core. The above has mentioned how to calculate the base address of the SMRAM corresponds to the logical cores, and how to further calculate the address of the state save area of the logical cores according to the formula BSP_SMM_BACE+APIC_ID× delta. This will not be described again here.

In some embodiments, the preset may include: performing, by the logical cores, mode setting according to the corresponding mode setting information, i.e., setting the value of the corresponding register to the setting value indicated in the mode setting information, to enter target operating mode; and setting the operating environment, by each of the logical cores, according to the corresponding operating environment information, i.e., setting the value of the corresponding register to the setting value indicated in the operating environment information, to complete the operating environment settings. The specific settings have been described in the aforementioned paragraphs, and will not be described again here.

In some embodiments, the logical cores must check whether the core configuration information is correct before the logical cores load these core configuration information into the registers. If there is an error, the computer system can be shutdown directly. After the logical cores confirm that the core configuration information is correct, the core configuration information is loaded into the corresponding register.

In step S209, while in the target operating mode, the logical cores determine the address of the SMI handler according to the base address of the SMRAM M2 corresponds to the logical cores, and execute the SMI handler. As shown in FIG. 8, the first logical core may directly use the base address obtained from the first MSR as the start address of the SMI handler, and the second logical core may directly use the base address of the corresponding SMRAM M2 determined in step S207 as the start address of the SMI handler. The RSN command at the end of the SMI handler (i.e., after all function codes in the SMI handler are executed) is executed to exit the SMM.

Through the response execution steps provided by Example 1 shown in FIG. 10, the address of the state save area, the address of the core configuration information memory space, and the address of the SMI handler can be determined based on the base address from the first MSR directly. The mode setting information included in the core configuration information makes each of the logical cores enter target operating mode directly using hardware settings every time after entering the SMM, and thus there is no need to perform a fixed operation of mode switching when executing the SMI handler, thereby improving efficiency when executing the SMI handler. Further, the core configuration information can be customized (e.g., the general purpose registers can be customized) to meet practical needs, which reduces the setting operations when executing the SMI handler and improves the efficiency of the execution of the SMI handler.

In another implementation, FIG. 7 may not include step S203 and step S204, and the SMRAM M2 in FIG. 8 may not include the core configuration information memory space. Correspondingly, the hardware of each of the logical cores includes the predetermined core configuration information, and in step S208 in FIG. 10, the logical cores are preset by the hardware of each of the logical cores through the predetermined core configuration information.

Example 2 (Described Below with Reference to FIG. 8 and FIGS. 11-13)

Figure 11:
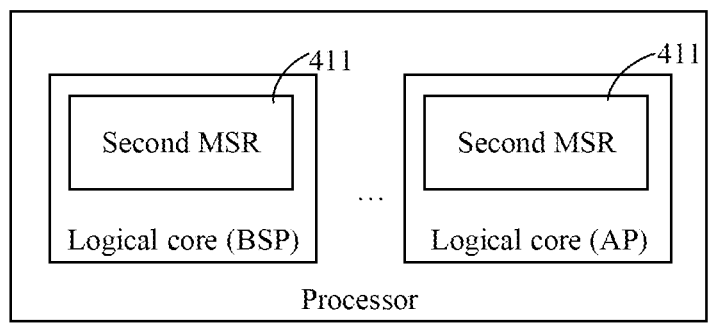
FIG. 11 shows a block diagram of the processor applied by Example 2 according to an embodiment of the present disclosure.

FIG. 11 shows a block diagram of a processor applied by Example 2 according to an embodiment of the present disclosure. As shown in FIG. 11, the method is applied to the processor shown in FIG. 11, in which the processor includes one or more logical cores, and each of the logical cores includes a second MSR 411. The second MSR 411 allocated in each of the logical cores may be located inside the logical cores, as shown in FIG. 11, but may also located outside the logical cores. The present disclosure is not limit thereto. The logical cores include one first logical core (e.g., the BSP) and at least one second logical core (e.g., the AP). For simplicity, FIG. 11 only schematically shows that the processor includes two logical cores.

Figure 12:
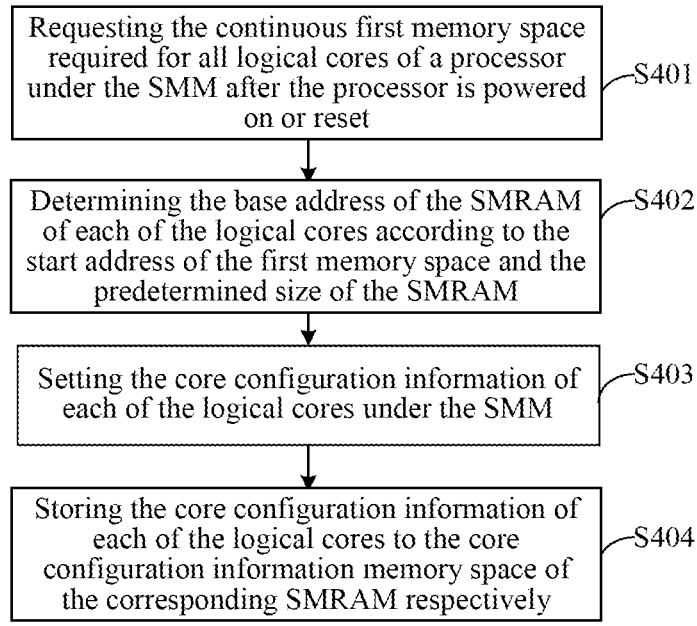
FIG. 12 shows a flow chart of the initialization settings in Example 2 according to an embodiment of the present disclosure.

FIG. 12 shows a flow chart of the initialization settings of Example 2 according to an embodiment of the present disclosure. As shown in FIG. 12, the initialization settings of the method may include steps S401-S404.

In step S401, after the processor is powered up or reset, the first logical core of the processor executes the BIOS to request the first memory space MM (as shown in FIG. 8) required while in the SMM for all logical cores in the processor. The first memory space MM is a continuous memory space. The implementation of requesting the continuous first memory space MM can be referred to step S201 above, thus will not be described again to avoid redundancy.

In this embodiment, the initialization settings first apply for the first memory space MM as shown in FIG. 8, then allocate a SMRAM M2 that is shown in FIG. 8 to each of the logical cores. The implementations of the first memory space MM and the SMRAM M2 can be referred to the paragraphs above, thus will not be described again here.

In step S402, the first logical core executes the BIOS to determine the base address of the SMRAM M2 of each of the logical cores according to the start address of the first memory space MM and the preset size of the SMRAM, and notifies each of the logical cores to store its corresponding base address to the configured second MSR. The start address of the first memory space MM may be configured as the base address of the SMRAM M2 of the first logical core directly. Next, calculating the base address of the SMRAM M2 of each of the second logical cores based on the base address and the association of the base addresses of the first logical cores and each second logical core. This implementation of calculating the base address of the SMRAM M2 of each of the second logical cores based on the base address and the association of the base addresses of the first logical cores is the same as the paragraphs above, thus can be referred to the above paragraphs and will not be described again to avoid redundancy.

After determining the corresponding base address of each of the logical cores, the first logical core may send the inter-processor interrupt (IPI) to each of the logical cores, so that the logical core that receives the IPI stores the base address of its corresponding SMRAM M2 to its second MSR. The logical cores that have received the IPI may execute in parallel, thus the execution efficiency is improved. Specifically, the first logical core write the start address of the SMRAM M2 allocated to each of the logical cores into different memory spaces that all logical cores can access. Next, the first logical core sends the IPI to all second logical cores. Each of the second logical cores starts to execute the initialization interrupt handler in response to the received IPI, wherein the initialization interrupt handler of each of the second logical cores may be the initialization interrupt handler that is written previously, assigned an interrupt vector, and set to be the interrupt handler of each of the second logical cores by the processor developer. Through the execution of the initialization interrupt handler, each second logical core reads the start address of its SMRAM M2 from the memory space corresponds to the memory which all logical cores can access. For example, the first logical core will write the start address of the SMRAM M2 allocated to the first second logical core into the memory space with an address addr1 in the shared memory (i.e., all logical cores can access the shared memory), and will write the start address of the SMRAM M2 allocated to the second second logical core into the memory space with an address addr2 in the shared memory (i.e., all logical cores can access the shared memory), etc. Then, the first logical core sends the IPI to all second logical cores. Each of the second logical cores starts executing the initialization interrupt handler in response to the received IPI, so that each of the logical cores reads the start address of its SMRAM M2 from the corresponding address in the shared memory. For example, the first second logical core may read the start address of the corresponding SMRAM M2 from the memory space with the address addr1 in the shared memory; the second second logical core may read the start address of the corresponding SMRAM M2 from the memory space with the address addr2 in the shared memory.

In step S403, the first logical core executes the BIOS to set the core configuration information of each of the logical cores while in the SMM.

In step S404, the first logical core executes the BIOS to store the core configuration information of each of the logical cores to the corresponding core configuration information memory space in the first memory space MM as shown in FIG. 8. The address of the core configuration information memory space corresponding to each of the core configuration information is determined according to the base address of the SMRAM M2 of each of the logical cores.

The implementations of steps S430 and S404 above are similar to the aforementioned steps S203 and S204. A more detailed description can be inferred by analogy by referring to the above paragraphs, and will not be described again to avoid redundancy.

Using the initialization settings provided in Example 2 as shown in FIG. 12, each of the logical cores may execute the initialization settings of the SMM in parallel, thus improves the efficiency of initializing the SMM. Moreover, since the base address of the SMRAM M2 set for each of the logical cores is stored to its second MSR, the time for obtaining the base address of the corresponding SMRAM M2 of each of the logical cores can be reduced. The mode setting information included in the core configuration information allows each of the logical cores to enter target operating mode directly through the hardware settings every time after entering the SMM. Thus, there is no need to perform a fixed operation of mode switching when executing the SMI handler, and this improves the efficiency of executing the SMI handler. In addition, the core configuration information may be customized to meet practical needs, further reduces the time for setting when executing the SMI handler, and further improves the efficiency of executing the SMI handler.

Figure 13:
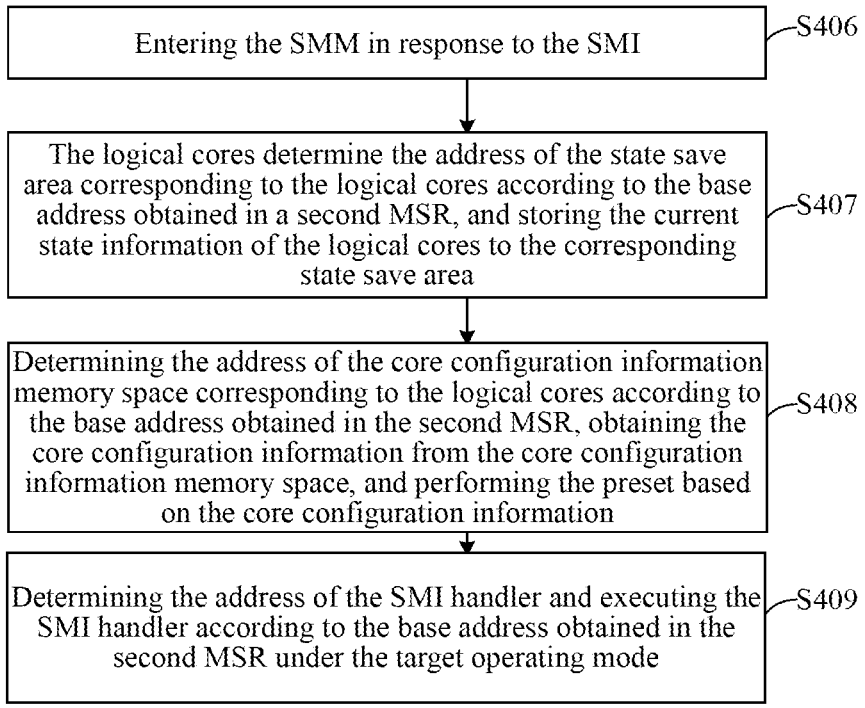
FIG. 13 shows a flow chart of the method for entering the SMM in Example 2 according to an embodiment of the present disclosure.

FIG. 13 shows a flow chart of a method for entering the system management mode in Example 2 according to an embodiment of the present disclosure. As shown in FIG. 13, in the method, after the initialization settings of the SMRAM are completed, any one of the logical cores of the processor as shown in FIG. 11 may handle the SMI. The response execution steps shown in FIG. 13 are the specific processes for the logical cores to handle the SMI. The response execution steps may be executed by any one of the logical cores in the processor, and the response execution steps can be executed by one or more logical cores in the processor simultaneously. As shown in FIG. 13, the response execution steps may include steps S406-S409. Steps S406-S408 are implemented by the hardware of the logical cores, and step S409 is implemented by the logical cores through executing the SMI handler. In step S406, the logical cores enter the SMM in response to the SMI.

In step S407, the logical cores read the corresponding base address (i.e., the base address of the SMRAM of the logical core) from the corresponding second MSR, then determine the address of the corresponding state save area based on the obtained base address. Next, the logical cores store the current state information to the corresponding state save area according to the address of the determined state save area. As shown in FIG. 8, the logical core can add its own base address and the address offset of the state save area directly to obtain the address of the corresponding state save area in the allocated SMRAM M2 of the logical cores.

In step S408, the logical cores determine the address of the core configuration information memory space corresponding to the logical cores according to the base address in the corresponding second MSR, obtain the core configuration information from the core configuration information memory space, and perform the preset based on the obtained core configuration information. As shown in FIG. 8, after obtaining the base address from the corresponding second MSR, the logical cores may add the base address and the address offset of the core configuration information directly to get the address of the core configuration information memory space of the logical cores.

In some embodiments, the preset may include: performing, by the logical cores, a mode setting according to the corresponding mode setting information, i.e., setting the value of the corresponding mode setting registers to the setting value indicated in the mode setting information, to enter target operating mode. The preset may include using each of the logical cores to set the operating environment according to the corresponding operating environment information, i.e., setting the value of the corresponding registers to the setting value indicated in the operating environment information, to complete the operating environment setting. The specific way of the settings is described in the previous paragraphs, and will not be described again here.

In some embodiments, before loading these core configuration information into the registers, the logical cores need to check whether these core configuration information is correct. If there is an error, the computer system may be shutdown directly. After confirming that the core configuration information is correct, the logical cores will load these core configuration information into the corresponding register.

In step S409, while in the target operating mode, the logical cores determine the address of the SMI handler and execute the SMI handler according to the base address obtained in the second MSR. As shown in FIG. 8, the logical cores may use the base address obtained in the second MSR as the start address of the SMI handler. The logical cores execute the RSM command at the end of the SMI handler (i.e., after executing all function codes in the SMI handler) to exit the SMM.

Through the response execution steps provided by Example 2 shown in FIG. 13, each of the logical cores may determine the address of the state save area, the address of the core configuration information memory space, and the address of the entry of the SMI handler directly based on the base address stored in the second MSR. The mode setting information included in the core configuration information allows each of the logical cores to enter target operating mode directly through the hardware setting every time after entering the SMM. Thus, there is no need to perform a fixed operation of mode switching when executing the SMI handler, and hence may improve efficiency when executing the SMI handler. In addition, since the core configuration information can be customized to meet practical needs, this further reduces the setting operations required when executing the SMI handler, and hence further improves efficiency when executing the SMI handler.

In another implementation, FIG. 12 may not include steps S403 and S404, and the SMRAM M2 in FIG. 8 may not include the core configuration information memory space. Correspondingly, the hardware of each of the logical cores includes the predetermined core configuration information, and in step S408 in FIG. 13, the hardware of each of the logical cores presets the logical cores through the predetermined core configuration information.

Example 3 (Described Below with Reference to FIG. 11 and FIGS. 13-15)

Figure 14:
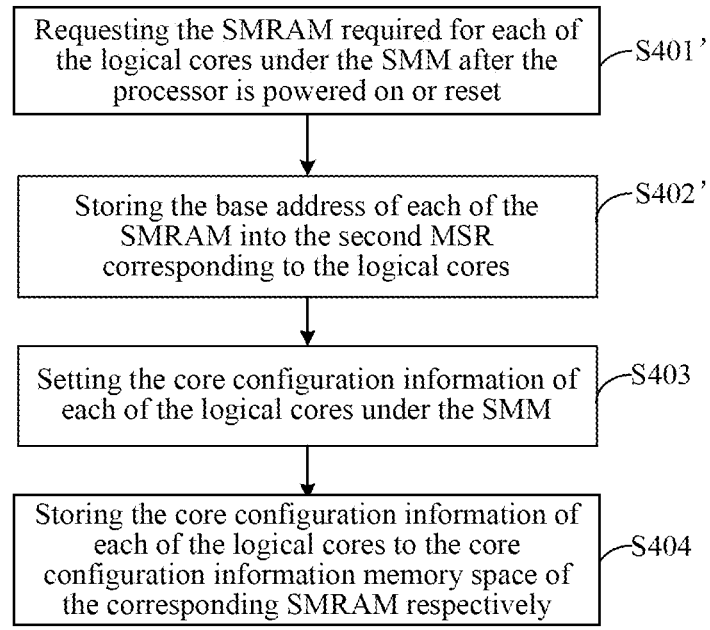
FIG. 14 shows a flow chart of the initialization settings in Example 3 according to an embodiment of the present disclosure.

This method is still applied to the processor as shown in FIG. 11. The methods provided by Example 3 and Example 2 only differ in the initialization settings. FIG. 14 shows a flow chart of the initialization settings in Example 3 according to an embodiment of the present disclosure. As shown in FIG. 14, in the method, the initialization settings include steps S401', S402', S403, and S404. In the method, the response execution steps include the steps as shown in FIG. 13. That is, the methods provided by Example 2 and Example 3 only differ in the first two steps of the initialization settings, while the other steps are the same. To avoid redundancy, only the different steps S401' and S402' will be described, and the other steps and the related beneficial effects are referred to the above Example 2, and will not be described here.

Figure 15:
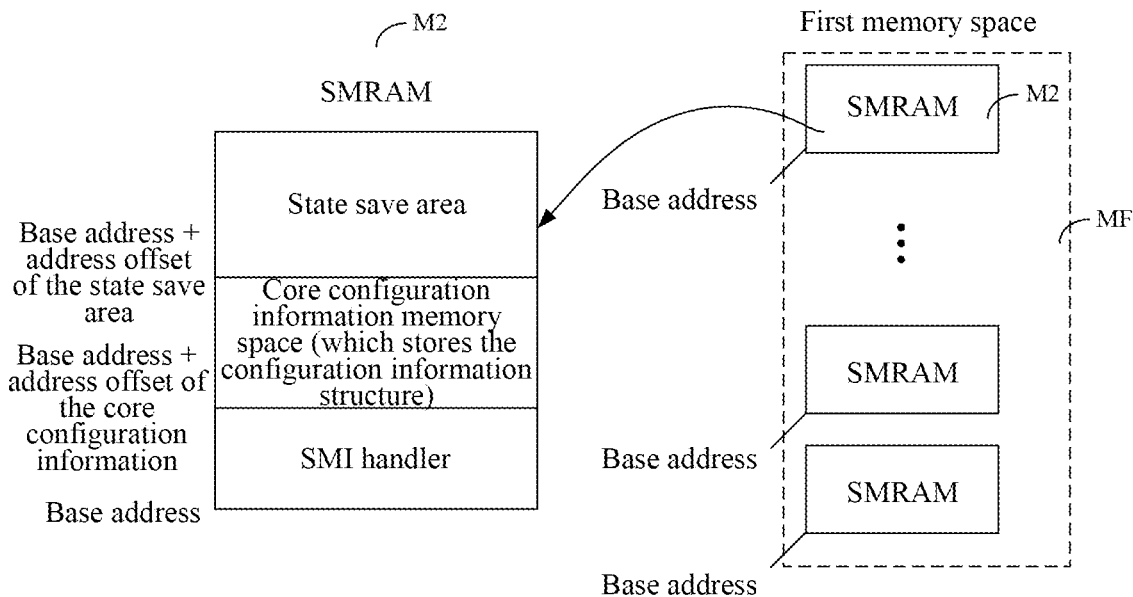
FIG. 15 shows a schematic diagram of the SMRAM and the first memory space in Example 3 according to an embodiment of the present disclosure.

In step S401', after the processor is powered up or reset, the first logical core of the processor executes the BIOS to apply for the SMRAM M2, as shown in FIG. 15, required for each of the logical cores while in the SMM.

FIG. 15 shows a schematic diagram of the first memory space and the SMRAM in Example 3 according to an embodiment of the present disclosure. In some embodiments, as shown in FIG. 15, the SMRAM M2 of each of the logical cores constitutes the first memory space MF. In the first memory space MF, the SMRAM of each of the logical cores may be in a discontinuous memory space, i.e., the first memory space MF is a discontinuous memory space, and each SMRAM M2 is a continuous memory space. To facilitate unified management, the SMRAM M2 of each of the logical cores may have the same predetermined SMRAM size. The implementation of the SMRAM M2 can be referred to the associated description of the SMRAM M2 in FIG. 8 above, and will not be described here to avoid redundancy.

In step S402', the first logical core executes the BIOS to determine the start address of the SMRAM M2 of each of the logical cores as the corresponding base address of the logical cores, and to notify each of the logical cores to store its corresponding SMBase into its second MSR by sending the IPI to each of the logical cores. The way to notify each of the logical cores to store its corresponding SMBase into its second MSR by sending the IPI to each of the logical cores has been described above, and will not be described here again. Then, steps S403 and S404 are executed.

In this way, in the embodiment of Example 3, since the first memory space can be a discontinuous memory space, the memory space can be utilized more efficiently, and the fragmentation of the memory space can be reduced.

In another implementation, FIG. 14 may not include steps S403 and S404, and the SMRAM M2 in FIG. 15 may not include core configuration information memory space. Correspondingly, the hardware of each of the logical cores includes the presetting core configuration information, and in step S408 in FIG. 13, the hardware of each of the logical cores presets the logical cores through the presetting core configuration information.

Example 4 (Described Below with Reference to FIGS. 16-23)

Figure 16:
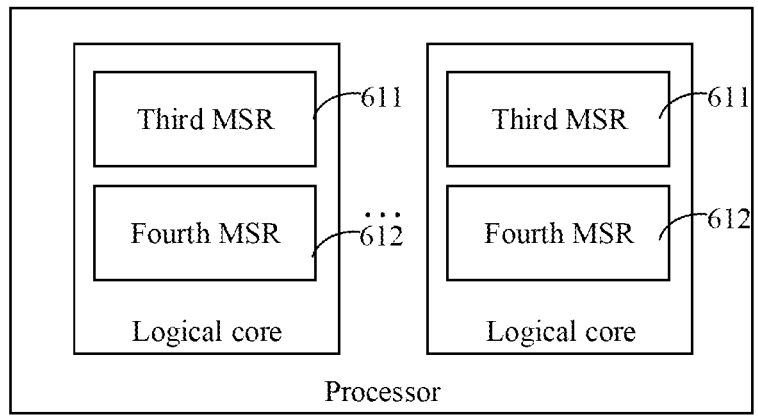
FIG. 16 shows a block diagram of the processor applied by Example 4 according to an embodiment of the present disclosure.

FIG. 16 shows a block diagram of a processor applied to the Example 4 according to an embodiment of the present disclosure. The method is applied to the processor as shown in FIG. 16. The processor may include one or more logical cores. A third MSR 611 and a fourth MSR 612 are provided for each of the logical cores. The third MSR 611 of each of the logical cores may be located in the logical cores as shown in FIG. 16, or may also be located outside the logical cores; similarly, the fourth MSR 612 of each of the logical cores may be located in the logical cores as shown in FIG. 16, or may also be located outside the logical cores. For simplicity, FIG. 16 only schematically shows that the processor includes two logical cores.

Figure 17:
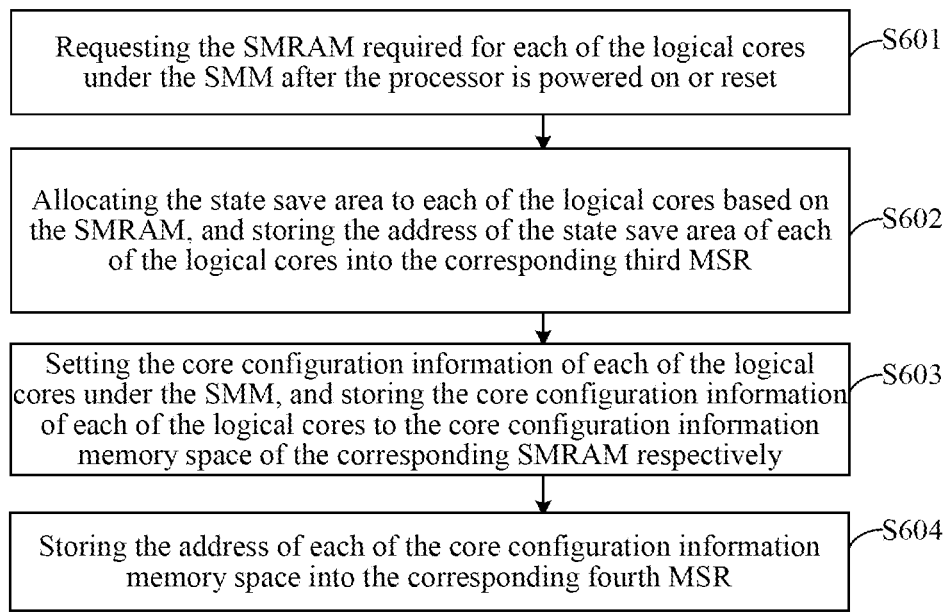
FIG. 17 shows a flow chart of the initialization settings in Example 4 according to an embodiment of the present disclosure.

FIG. 17 shows a flow chart of the initialization settings in Example 4 according to an embodiment of the present disclosure. As shown in FIG. 17, in the method, the initialization settings include steps S601-S604.

Figure 18:
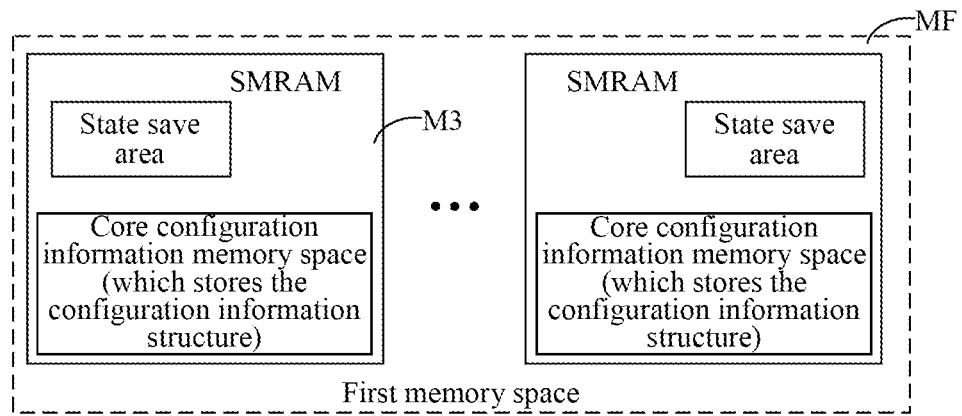
FIGS. 18-20 show schematic diagrams of the SMRAM and the first memory space in Example 4 according to an embodiment of the present disclosure.
Figure 19:
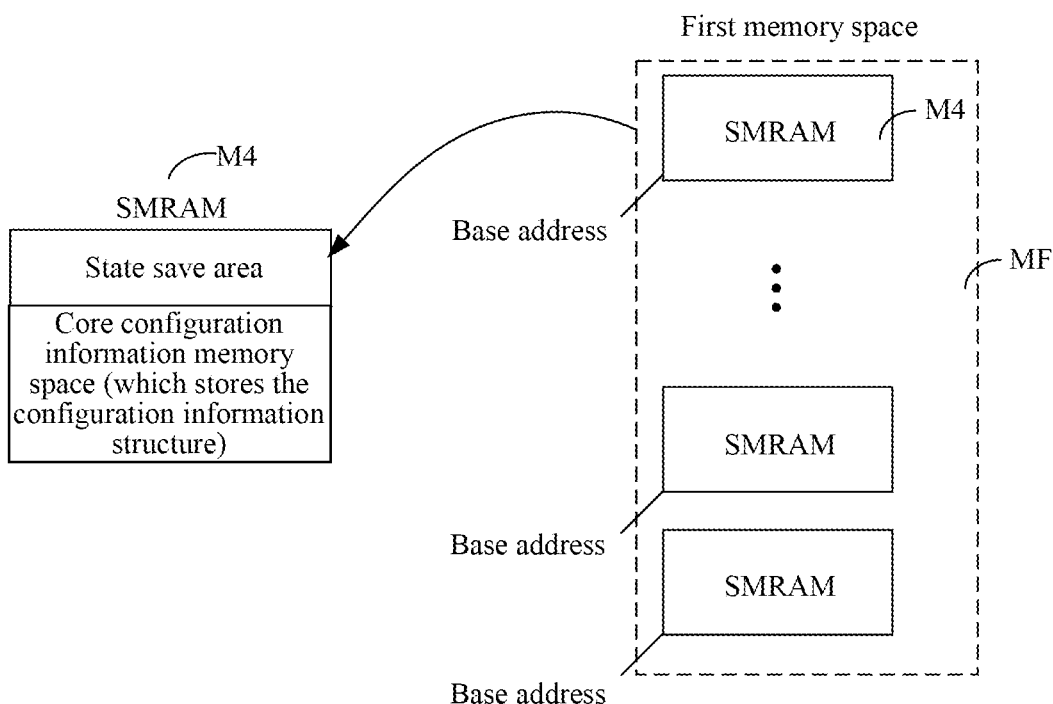
Figure 20:
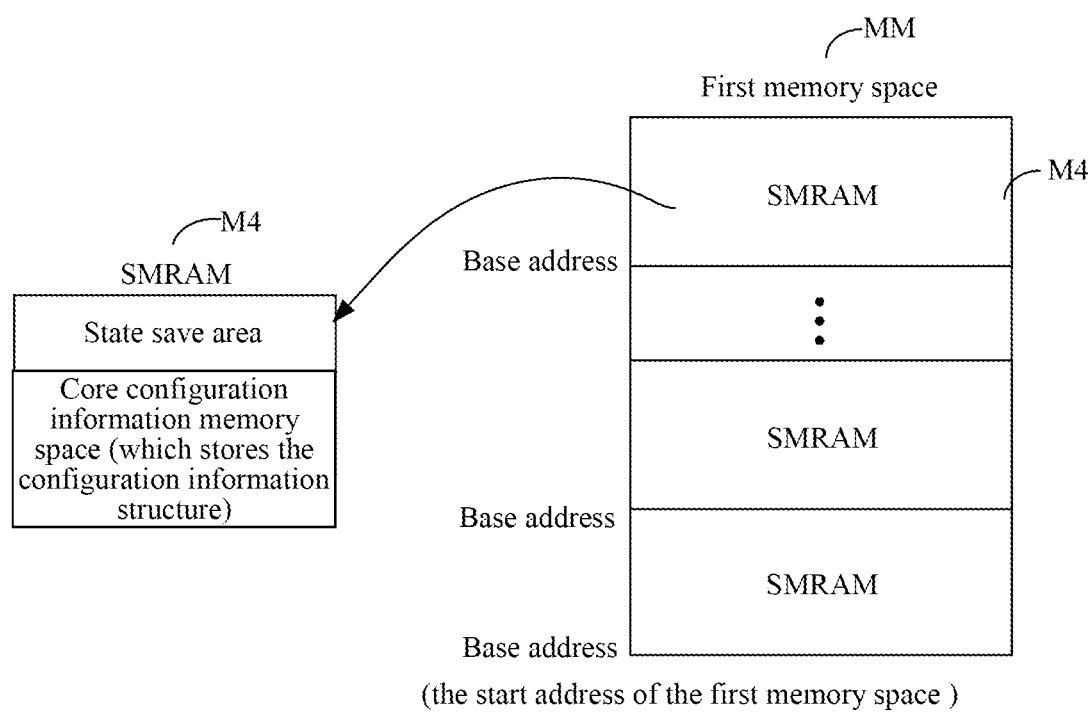

In step S601, after the processor is powered up or reset, the logical cores of the processor (for example, the first logical core (e.g., BSP) in a plurality of logical cores) execute the BIOS to request the first memory space required for the processor while in the SMM. The first memory space can be the discontinuous first memory space MF as shown in FIG. 18 and FIG. 19, or can be the continuous memory space MM as shown in FIG. 20. It only needs to ensure that the state save area of each of the logical cores is a continuous memory space, and the core configuration information memory space of each of the logical cores is also a continuous memory space. The present disclosure is not limit thereto.

In step S602, the first logical core executes the BIOS to allocate the state save area for each of the logical cores according to the first memory space, and stores the address of the state save area of each of the logical cores into the corresponding third MSR of the logical cores. Different logical cores correspond to different state save areas. The first logical core may notify each of the logical cores to store its respective address of the state save area into the corresponding set third MSR by sending the IPI to each of the logical core.

FIGS. 18-20 show schematic diagrams of the first memory space and the SMRAM in Example 4 according to an embodiment of the present disclosure. As shown in FIG. 18, if the first memory space MF applied for in Example 4 is a discontinuous memory space, a memory space as the state save area and a memory space as the core configuration information memory space can be allocated from the first memory space MF for each logical core respectively. The SMRAM M3 of the same logical core is a discontinuous memory space, i.e., the state save area and the core configuration information memory space of the SMRAM M3 of the same logical core are discontinuous.

In some embodiments, as shown in FIG. 19, if the first memory space MF applied for in Example 4 is a discontinuous memory space, each of the logical cores may be allocated a memory space as the state save area and a memory space as the core configuration information memory space from the first memory space MF respectively. The SMRAM M4 of the same logical core is a continuous memory space, i.e., the state save area and the core configuration information memory space of the SMRAM M4 of the same logical core are continuous.

In some embodiments, as shown in FIG. 20, if the first memory space MM applied for in Example 4 is a continuous memory space, a memory space as the state save area and a memory space as the core configuration information memory space can be allocated from the first memory space MM for each logical core respectively. The SMRAM M4 of the same logical core is a continuous memory space, i.e., the state save area of the SMRAM M4 and the core configuration information memory space of the same logical core are continuous. In another embodiments, if the first memory space MM in Example 4 is a continuous memory space, the SMRAM M4 of the same logical core is a discontinuous memory space, i.e., the state save area and the core configuration information memory space of the SMRAM M4 of the same logical core are discontinuous.

In some embodiments, each of the logical cores can be controlled to form a corresponding saving area structure according to the address of the allocated state save area, and to store the saving area structure into the corresponding third MSR. The specific way of notifying each of the logical cores to store the address of its corresponding state save area into the set third MSR by sending the IPI to each of the logical cores can be referred to the above descriptions of setting the second MSR, and will not be described again here.

In step S603, the first logical core executes the BIOS to set the core configuration information of each of the logical cores while in the SMM, and store each of the core configuration information to the core configuration information memory space of the corresponding SMRAM (as shown in FIGS. 18-20). The core configuration information includes the mode setting information required for performing the mode setting before the logical cores execute the SMI handler, the operating environment information required for performing the operating environment setting before the logical cores execute the SMI handler, and the address of the SMI handler.

Figure 21:
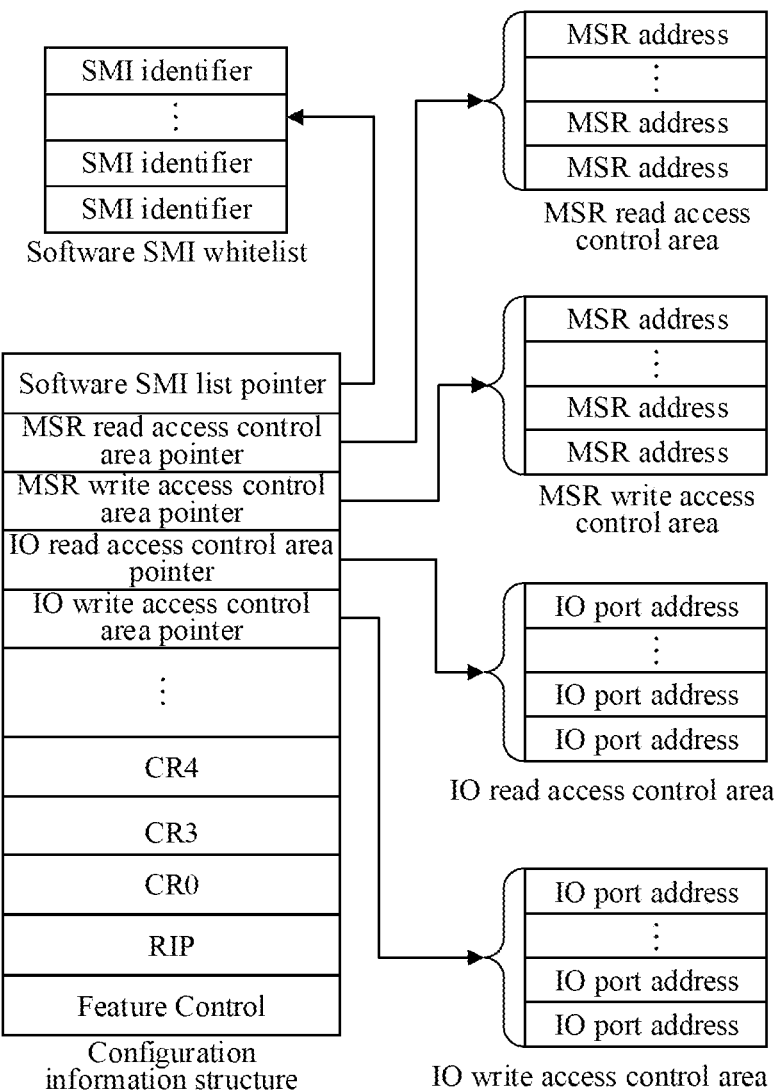
FIG. 21 shows a schematic diagram of the configuration information structure according to an embodiment of the present disclosure.

FIG. 21 shows a schematic diagram of the configuration information structure according to an embodiment of the present disclosure. In this embodiment, after determining the core configuration information, the configuration information structure of each of the core configuration information as shown in FIG. 21 can be generated according to the core configuration information of each of the logical cores; then, each of the configuration information structures is stored to the core configuration information memory space in the corresponding SMRAM respectively (as shown in FIGS. 18-20). The configuration information structure includes a plurality of information fields. Each of the information fields is configured to store the corresponding core configuration information or the memory address of the corresponding core configuration information.

The difference between the configuration information structures in FIG. 9 and FIG. 21 is that the configuration information structure as shown in FIG. 21 further includes the address of the SMI handler, i.e., the RIP as shown in FIG. 21. The implementation of the configuration information structure can be inferred by analogy by referring to the associated description of the configuration information structure as shown in FIG. 9 above, and will not be described again here to avoid redundancy.

In step S604, the first logical core executes the BIOS to store the address of each of the core configuration information memory space into the corresponding fourth MSR. Each of the logical cores is notified to store the pointer indicating the address of the core configuration information memory space where the configuration information structure is located in the corresponding fourth MSR by sending the IPI to each of the logical cores. The specific way to notify each of the logical cores to store the address of its corresponding state save area in the set fourth MSR can be referred to the above description of setting the second MSR, and will not be described again here.

Using the initialization settings provided in Example 4 as shown in FIG. 17, the setting of the state save area and the core configuration information of each of the logical cores may be implemented in parallel (i.e., each of the logical cores may execute the associated setting operations in parallel after receiving the IPI), in which the setting is fast, the required time is short, and the reasonable setting of the memory space is implemented to avoid memory fragmentation and facilitate memory management. Every time after entering the SMM, each of the logical cores does not need to perform a fixed operation of mode switching when executing the SMI handler. This can improve the execution efficiency of the SMI handler. Additionally, since the core configuration information can be customized to meet practical needs, the required setting operations when executing the SMI handler can be further reduced, thus further improves the execution efficiency of the SMI handler. In this way, it ensures that each of the logical cores can respond to the SMI and execute the SMI handler through the preset of steps S601-S604.

Figure 22:
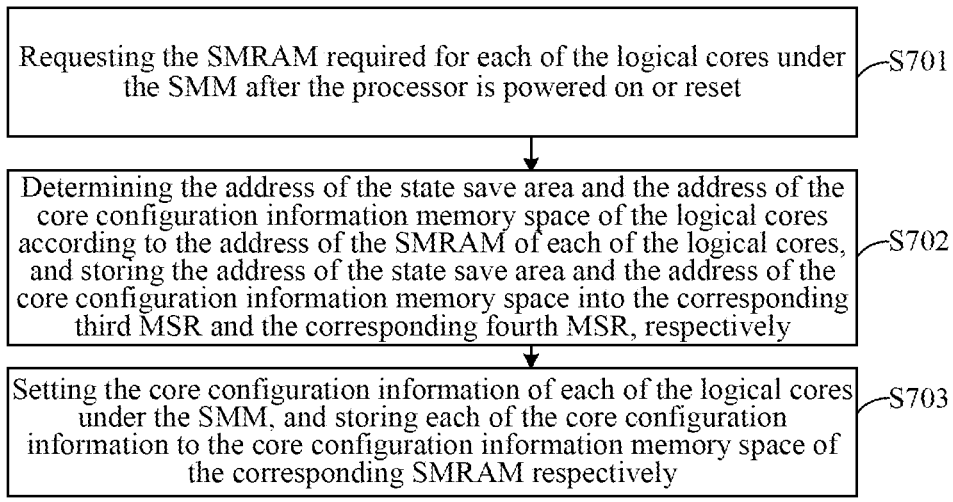
FIG. 22 shows a flow chart of the initialization settings in Example 4 according to an embodiment of the present disclosure.

FIG. 22 shows a flow chart of the initialization settings in Example 4 according to an embodiment of the present disclosure. The execution steps of the initialization settings in Example 4 can be set to meet practical needs, and can be set according to the method as shown in FIG. 17, or can also be set according to steps S701-S703 as shown in FIG. 22.

As shown in FIG. 22, step S701 is the same as the above step S601, and will not be described again here to avoid redundancy. In step S702, the first logical core executes the BIOS to allocate the state save area and the core configuration information memory space for each of the logical cores according to the first memory space, and stores the address of the state save area and the address of the core configuration information memory space of each of the logical cores into its corresponding third MSR and its corresponding fourth MSR, respectively. Each of the logical cores may be notified to store the address of its corresponding state save area and the address of its corresponding core configuration information memory space into the corresponding third MSR and the corresponding fourth MSR by sending the IPI. Step S703 is the same as the above step S603, and will not be described again here to avoid redundancy.

Figure 23:
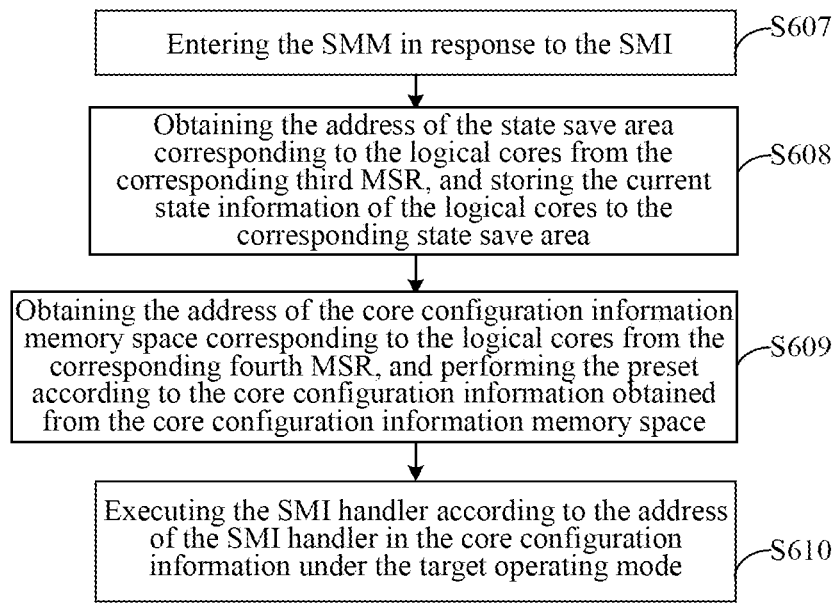
FIG. 23 shows a flow chart of the method for entering the SMM in Example 4 according to an embodiment of the present disclosure.

FIG. 23 shows a flow chart of the method for entering the system management mode (SMM) in Example 4 according to an embodiment of the resent disclosure. As shown in FIG. 23, after the method completes the initialization settings, the method may further include the response execution steps. The response execution steps can be executed by any one of the logical cores in the processor as shown in FIG. 16, and the processor may have one or more logical cores executing the response execution steps simultaneously. As shown in FIG. 23, the response execution steps may include steps S607-S610. Steps S607-S609 are implemented by the hardware of the logical cores, and step S610 is implemented by the logical cores through the execution of the SMI handler.

In step S607, the logical cores enter the SMM in response to the SMI.

In step S608, the logical cores obtain the address of the state save area corresponding to the logical cores from the corresponding third MSR, and store the current state information of the logical cores into the corresponding state save area based on the address of the state save area. Each of the logical cores may first obtain the state save area structure from the corresponding third MSR. Further, the logical cores determine the address of the state save area based on the state save area structure. Then, the logical cores store the current state information of the logical cores to the state save area according to the address of the state save area.

In step S609, the logical cores obtain the address of the core configuration information memory space where the core configuration information corresponding to the logical cores is located from the corresponding fourth MSR, and perform the preset according to the core configuration information obtained in the core configuration information memory space. The logical cores can first obtain the address of the core configuration information structure from the corresponding fourth MSR. Further, the logical cores obtain the configuration information structure from the address of the determined core configuration information structure.

Then, the logical cores determine each of the core configuration information based on the core configuration information structure.

In some embodiments, the preset may include: performing, by the logical cores, a mode setting according to the corresponding mode setting information, i.e., setting the value of the corresponding register to the setting value indicated in the mode setting information, to enter target operating mode. The preset may include setting, using each of the logical cores, the operating environment according to the corresponding operating environment information, i.e., setting the value of the corresponding register to the setting value indicated in the operating environment information, to complete the operating environment setting. The specific settings are described in the above paragraphs, and will not be described again here.

In some embodiments, the logical cores must check whether these core configuration information is correct before loading these core configuration information into the registers. If there is an error, the computer system can be shutdown directly. After confirming that the core configuration information is correct, the logical cores will load these core configuration information into the corresponding registers.

In step S610, while in the target operating mode, the logical cores execute the SMI handler according to the address of the SMI handler in the core configuration information. The RSM command is executed at the end of the SMI handler to exit the SMM.

Through the response execution steps provided by Example 4 as shown in FIG. 23, the settings of the state save area and the core configuration information of each of the logical cores can be implemented in parallel (i.e., each of the logical cores can execute the associated setting operations in parallel after receiving the IPI), the setting is fast, the required time is short, and the reasonable setting of the memory space is implemented to avoid memory fragmentation and facilitate memory management. Every time after entering the SMM, each of the logical cores does not need to perform a fixed operation of mode switching when executing the SMI, which improves the execution efficiency of the SMI. Additionally, since the core configuration information can be customized to meet practical needs, the setting operations required when executing the SMI handler may be further reduced, and thus, further improves the execution efficiency of the SMI handler.

Example 5 (Described Below with Reference to FIG. 11)

The method is applied to the processor as shown in FIG. 11. The methods provided by Example 5 and Example 4 only differ in the storing of the addresses. In Example 5, in the initialization settings, the address of the state save area and the address of the core configuration information memory space of each of the logical cores are both stored in the second MSR of the logical cores; in the response execution steps, each of the logical cores obtains the corresponding address of the state save area and the corresponding address of the core configuration information memory space from its second MSR. The rest of the steps are the same, thus the beneficial effects of the rest of the steps and the related steps are referred to the above Example 4 and will not be described again here.

Example 6 (Described Below with Reference to FIGS. 9, 19, 20, and 24-28)

Figure 24:
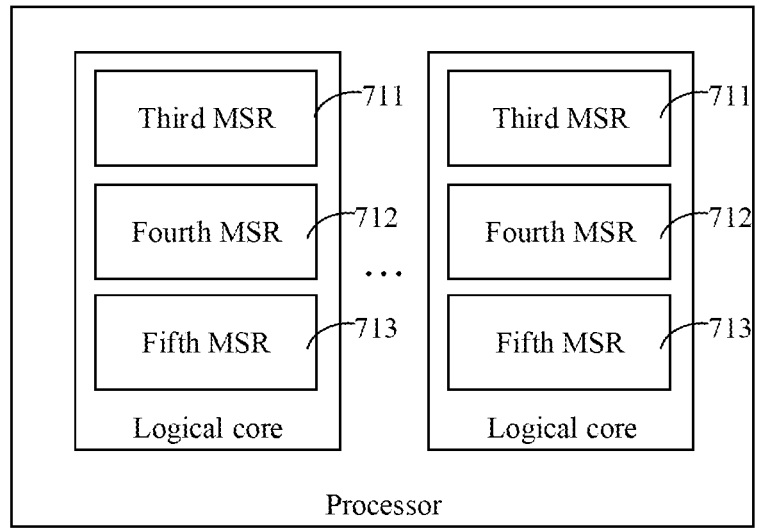
FIG. 24 shows a block diagram of the processor applied by Example 6 according to an embodiment of the present disclosure.

FIG. 24 shows a block diagram of the processor applied by Example 6 according to an embodiment of the present disclosure. The method is applied to the processor as shown in FIG. 24, and the processor may include one or more logical cores. A third MSR 711, a fourth MSR 712, and a fifth MSR 713 are set for each of the logical cores. The MSR of each of the logical cores (the third MSR 711, the fourth MSR 712, and the fifth MSR 713) can be set in the logical cores, as shown in FIG. 24, or can be set outside the logical cores. The present disclosure is not limit thereto. For simplicity, FIG. 24 only shows that the processor includes two logical cores.

The differences between Example 6 and Example 4 are: the third MSR 711 is configured to store the address of the state save area of the corresponding logical core, the fourth MSR 712 is configured to store the address of the core configuration information memory space of the corresponding logical core, and the fifth MSR 713 is configured to store the address of the SMI handler. The core configuration information in Example 6 only includes mode setting information and operating environment information. That is, the configuration information structure as shown in FIG. 9 is stored in the core configuration information memory space in Example 6.

Figure 25:
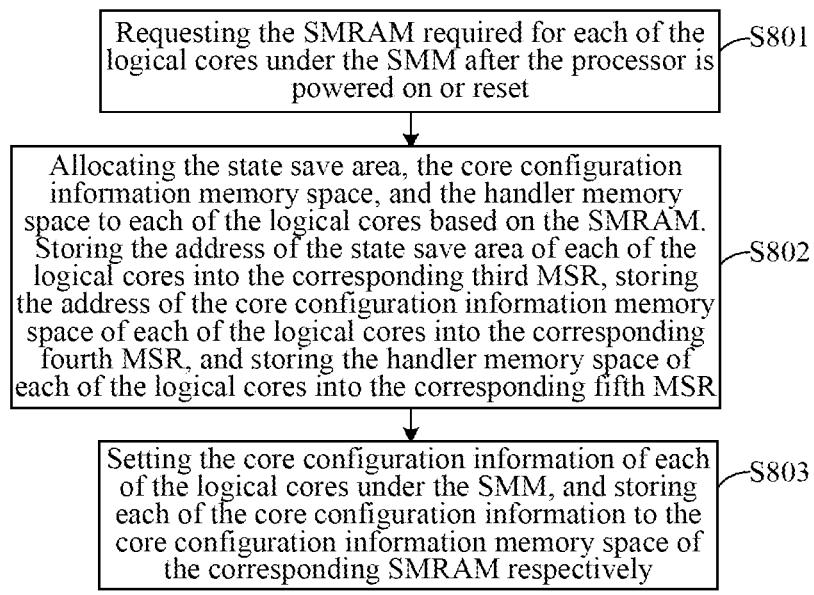
FIG. 25 shows a flow chart of the initialization settings in Example 6 according to an embodiment of the present disclosure.

FIG. 25 shows a flow chart of the initialization settings in Example 6 according to an embodiment of the present disclosure. As shown in FIG. 25, in the method, the initialization settings may include steps S801-S803.

In step S801, after the processor is powered up or reset, the logical cores of the processor (for example, the first logical core (e.g., the BSP) of a plurality of logical cores) request the SMRAM required in the SMM for each of the logical cores by executing the BIOS.

Figure 26:
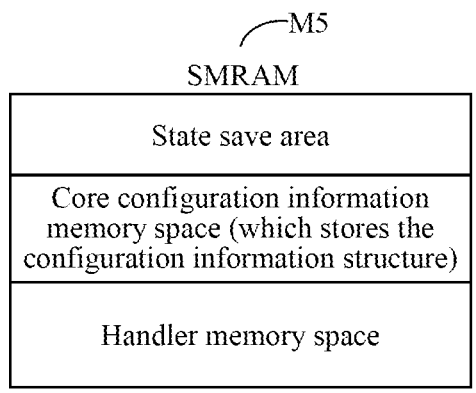
FIGS. 26 and 27 show schematic diagrams of the SMRAM in Example 6 according to an embodiment of the present disclosure.
Figure 27:
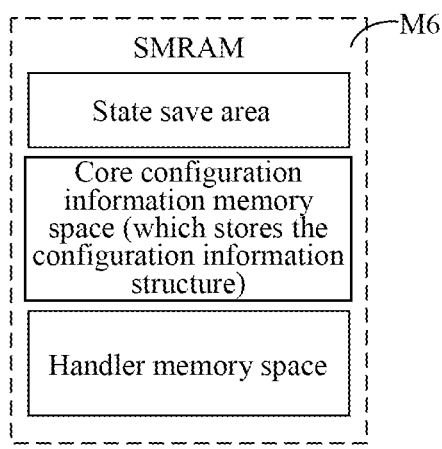

FIGS. 26-27 show a schematic diagram of the SMRAM in Example 6 according to an embodiment of the present disclosure. The SMRAM of each of the logical cores can be the continuous SMRAM M5 as shown in FIG. 26, or can also be the discontinuous SMRAM M6 as shown in FIG. 27. The present disclosure is not limit thereto. It only needs to ensure that the state save area and the core configuration information memory space of each of the logical cores are both continuous memory space, and the handler memory space is a continuous memory space. The present disclosure does not restrict whether the three memory spaces (the state save area, the core configuration information memory space, and the handler memory space) are continuous. In the first memory space composed of the SMRAM of all logical cores in Example 6, each SMRAM can be continuous as in FIG. 20, or can also be discontinuous as in FIG. 19, and the present disclosure is not limit thereto.

In step S802, the first logical core executes the BIOS to allocate the state save area, the core configuration information memory space, and the handler memory space to each of the logical cores according to the SMRAM of each of the logical cores. The first logical core stores the address of the state save area of each of the logical cores into the corresponding third MSR 711, stores the address of the core configuration information memory space of each of the logical cores into the corresponding fourth MSR 712, and stores the address of the handler memory space of each of the logical cores in the corresponding fifth MSR 713. Each of the logical cores can be notified to store the address of the state save area, the address of the core configuration information memory space, and the address of the handler memory space of each of the logical cores into the corresponding third MSR 711, fourth MSR 712, and fifth MSR 713, respectively, by sending the IPI to each of the logical cores.

In step S803, the first logical core executes the BIOS to set the core configuration information of each of the logical cores in the SMM, and stores the core configuration information to the core configuration information memory space of the corresponding SMRAM. The core configuration information includes the mode setting information and the operating environment information. The first logical core also stores the SMI handler in the corresponding handler memory space.

Using the initialization settings provided in Example 6 as shown in FIG. 25, the settings of the state save area, the core configuration information memory space, and the handler memory space of each of the logical cores can be implemented in parallel (i.e., each of the logical cores can execute the associated setting operations in parallel after receiving the IPI), the setting is fast, the required time is short, and the reasonable setting of the memory space is implemented to avoid memory fragmentation and facilitate memory management. Every time after entering the SMM, each of the logical cores does not need to perform a fixed operation of mode switching when executing the SMI handler, and this can improve the execution efficiency of the SMI handler. Additionally, since the core configuration information can be customized to meet practical needs, the setting operation required when executing the SMI handler can be further reduced, thus further improves the execution efficiency of the SMI handler.

Figure 28:
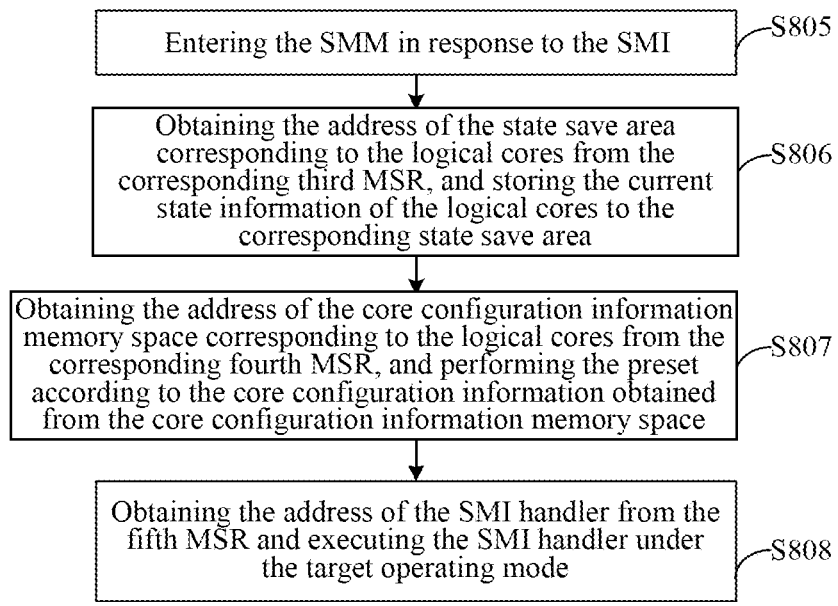
FIG. 28 shows a flow chart of the method for entering the SMM in Example 6 according to an embodiment of the present disclosure.

FIG. 28 shows a flow chart of the method for entering the SMM in Example 6 according to an embodiment of the present disclosure. As shown in FIG. 28, after the method completes the initialization settings, the method may also include the response execution steps. The response execution steps can be executed by any one of the logical cores in the processor as shown in FIG. 24, and the response execution steps can be performed by one or more logical cores in the processor simultaneously. As shown in FIG. 28, the response execution steps may include steps S805-S808. Steps S805-S807 are implemented by the hardware of the logical cores, and step S808 is implemented by the logical cores through executing the SMI handler.

In step S805, the logical cores enter the SMM in response to the SMI.

In step S806, the logical cores obtain the address of the corresponding state save area of the logical cores from the corresponding third MSR 711, and store the current state information of the logical cores to the corresponding state save area based on the address of the state save area.

In step S807, the logical cores obtain the address of the core configuration information memory space where the corresponding core configuration information of the logical cores is located from the corresponding fourth MSR 712, and perform the preset according to the core configuration information obtained from the core configuration information memory space. The logical cores may first obtain the address of the core configuration information structure from the corresponding fourth MSR 712, and further obtain the configuration information structure as shown in FIG. 9 from the address of the determined core configuration information structure. Then, the logical cores determine each of the core configuration information based on the core configuration information structure.

In some embodiments, the preset may include: performing, by the logical cores, mode setting according to the corresponding mode setting information, i.e., setting the value of the corresponding register to the setting value indicated in the mode setting information, to enter target operating mode; setting, using each of the logical cores, the operating environment according to the corresponding operating environment information, i.e., setting the value of the corresponding register to the setting value indicated in the operating environment information, to complete the operating environment setting. The specific way of performing the settings is described in the above paragraphs, and will not be described again here.

In some embodiments, the logical cores must check whether these core configuration information is correct before loading these core configuration information into the corresponding register. If there is an error, the computer system can be shutdown directly. After confirming that the core configuration information is correct, the logical cores load these core configuration information into the corresponding register.

In step S808, while in the target operating mode, the logical cores obtain the address of the SMI handler from the fifth MSR 713, and execute the SMI handler. The RSM command is executed at the end of the SMI handler in order to exit the SMM.

Through the response execution steps provided by Example 6 as shown in FIG. 25, the settings of the state save area, the core configuration information memory space, and the handler memory space of each of the logical cores can be implemented in parallel (i.e., each of the logical cores can execute the associated setting operations in parallel after receiving the IPI), the setting is fast, the required time is short, and the reasonable setting of the memory space is implemented to avoid memory fragmentation and facilitate memory management. Every time after entering the SMM, each of the logical cores does not need to perform a fixed operation of mode switching when executing the SMI handler, and this can improve the execution efficiency of the SMI handler. Additionally, since the core configuration information can be customized to meet practical needs, the setting operation required when executing the SMI handler can be further reduced, thus further improves the execution efficiency of the SMI handler.

Example 7

The method is applied to the processor as shown in FIG. 16. The methods provided by Example 7 and Example 6 only differ in storing the address. In Example 7, in the initialization settings, any two of the address of the state save area, the address of the core configuration information memory space, and the address of the handler memory space of each of the logical cores are stored in the corresponding third MSR, and the remaining one is stored in the corresponding fourth MSR. For example, the addresses of the state save area and the core configuration information memory space may be stored in the corresponding third MSR, and the address of the handler memory space may be stored in the corresponding fourth MSR. In the response execution steps, each of the logical cores obtain the address of its corresponding state save area, the address of its corresponding core configuration information memory space, and the address of its corresponding handler memory space from the corresponding MSR. The rest of the steps are the same, thus the beneficial effects of the remaining steps and the related steps can be referred to the above Example 6, and will not be described again here.

Figure 29:
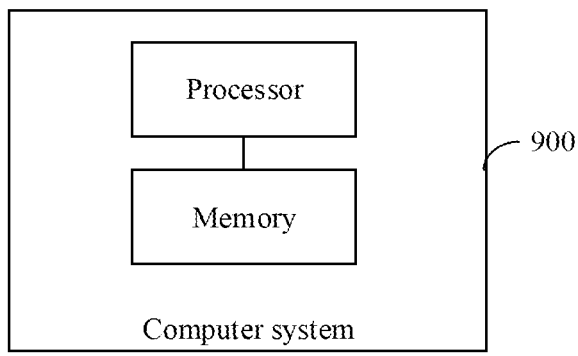
FIG. 29 shows a block diagram of a computer system according to an embodiment of the present disclosure.

FIG. 29 shows a block diagram of a computer system according to an embodiment of the present disclosure. As shown in FIG. 29, the computer system 900 includes a processor and a memory. The processor includes at least one logical core and at least one MSR.

The processor is configured to perform the initialization settings before each of the logical cores enter the SMM. The initialization settings include: allocating the SMRAM required for each of the logical cores in the SMM, in which the SMRAM corresponding to each of the logical cores is located in the memory; and storing the address related to the SMRAM of each of the logical cores into the corresponding MSR.

In a possible implementation, the logical cores are configured to execute the response execution steps after the execution of the steps of the initialization settings. The response execution steps include: entering the SMM in response to the SMI; storing the current state information of the logical cores into the state save area of the corresponding SMRAM; performing the preset of the logical cores according to the core configuration information obtained from the corresponding SMRAM; executing the SMI handler; wherein, the address of the state save area and the address of the core configuration information are determined based on the address stored in the corresponding MSR.

The processor as shown in FIG. 29 may be the processor as shown in the above FIGS. 6, 11, 16, and 24. The initialization settings and the response execution steps completed by the processor and the related beneficial effects can be referred to the above Examples 1-7, and will not be described again here to avoid redundancy.

It should be noted that although the above embodiments are used as examples to introduce the method, the processor, and the computer system for entering the SMM, those skilled in the art can understand that the present disclosure is not limit thereto. In fact, users may set each of the steps and devices flexibly according to personal preference and/or actual application scenarios, as long as they comply with the technical solutions of the present disclosure.

Embodiments of the present disclosure also provide a computer-readable storage medium where computer program instructions are stored. The above method is implemented when the computer program instructions are executed by the processor. The computer-readable storage medium can be volatile or non-volatile.

Embodiments of the present disclosure also provide an electronic device. The electronic device includes: a processor; a memory configured to store the instructions that can be executed by the processor; wherein, the processor is configured to implement the above method when executing the instructions stored in the memory.

Embodiments of the present disclosure also provide a computer program product. The computer program product includes computer-readable codes, or non-volatile computer-readable media that stores the computer-readable codes. When the computer-readable codes is running in the processor of the electronic device, the processor in the electronic device executes the above method.

The present disclosure may be systems, methods and/or computer program products. The computer program products may include computer-readable storage media, which store the computer-readable program instructions for the processor to implement the aspects of the present disclosure.

The computer-readable storage media may be physical devices that keep and store the instructions for the instruction execution devices. The computer-readable storage media may be, for example but not limit to, electrical storage devices, magnetic storage devices, semiconductor storage devices, or any suitable combinations of the above. The more specific examples (but not the exhaustive list) of the computer-readable storage media include: portable computer disks, hard disks, random access memories (RAM), read-only memories (ROM), erasable programmable read-only memories (EPROM or flash memories), static random access memory (SRAM), compact disk read-only memories (CD-ROM), digital versatile disks (DVD), memory sticks, floppy disks, mechanically encoded devices (e.g., hole cards or protruding structures in groove that store instructions), and any suitable combinations of the above. The computer-readable storage media herein are not construed as transient signals, such as radio waves or other freely propagating electromagnetic waves, electromagnetic waves propagating through wave guides or other transmission media (e.g., light pulses through fiber optical cables), or electrical signals propagating through wires.

The computer-readable program instructions herein can be downloaded from the computer-readable storage media to various computing/processing devices, or can be downloaded to external computers or storage devices through networks, such as the Internet, local area networks, wide area networks and/or wireless networks. The networks may include copper transmission cables, fiber optical transmission, wireless transmission, routers, firewalls, gateway computers, and/or edge servers. Network interface cards and network interfaces in each computing/processing device receives the computer-readable program instructions from the network, and forwards the computer-readable program instructions to store in the computer-readable storage media of each computing/processing device.

The computer program instructions for executing the operations of the present disclosure may be assembly instructions, instruction set architecture (ISA) instructions, machine instructions, machine-related instructions, microcode, firmware instructions, status setting information, or source codes or object codes written in any combinations of one or more programming languages. The programming languages include object-oriented programming languages (e.g., Smalltalk, C++, etc.) and conventional procedure programming languages (e.g., the "C" language or similar programming languages). The computer-readable program instructions may be executed entirely on the users' computers, partly on the users' computers, as a standalone software package, partly on the remote computers or servers, or entirely on remote computers or servers. In the cases that involve the remote computers, the remote computers may connect to the users' computers through any type of networks (including local area networks (LAN) or wide area networks (WAN)), or connect to the external computers (e.g., connecting through the Internet by the Internet service provider). In some embodiments, by utilizing the state information of the computer-readable program instructions to customize the electronic circuits (e.g., programmable logic circuits, field programmable gate array (FPGA), or programmable logic array (PLA)), the electronic circuits may execute the computer-readable program instructions, and thus implement the aspects of the present disclosure.

Aspects of the present disclosure are described herein with reference of flow charts and/or block diagrams of the methods, devices (or systems), and computer program products according to the embodiments of the present disclosure. It should be understood that each of the blocks and the combinations of each of the blocks in the flow charts and/or the block diagrams may be implemented by the computer-readable program instructions.

These computer-readable program instructions may be provided to the processor of general-purpose computers, special-purpose computers, or other programmable data processing devices. As a result, a machine/device that implements the functions/actions defined in one or more blocks of the flow charts and/or the block diagrams by executing these instruction through the processor of computers or other programmable data processing devices is produced. Additionally, these computer-readable program instructions may also be stored in the computer-readable storage media, wherein these instructions cause the computers, the programmable data processing devices and/or other devices to work in specific manners. As a result, the computer-readable storage media that store the instructions include a manufacture, and the manufacture includes the instructions implementing the aspects of the functions/actions defined in one or more blocks in the flow charts and/or the block diagrams.

The computer-readable program instructions may also be loaded onto the computers, the other programmable data processing devices, or the other devices to execute a series of operations in order to produce the procedure implemented by computers. As a result, the functions/actions defined in one or more blocks in the flow charts and/or the block diagrams are implemented by the instructions that are executed on the computers, the other programmable data processing devices, or the other devices.

The flow charts and the block diagrams in the figures illustrate the possible implementations of the architecture, functions, and operations of systems, methods, and computer program products according to various embodiments of the present disclosure. In this regard, each block in the flow charts and the block diagrams may represent a module, a code segment, or a portion of instructions. The module, the code segment, or the portion of instructions includes one or more executable instructions configured to implement the defined logical functions. In some alternative implementations, the functions noted in the blocks may occur in a different order as noted in the figures. For example, two consecutive blocks may actually be executed essentially in parallel, and may sometimes be executed in reverse order, depending on the functions involved. It should also be noted that each of the blocks and the combination of the blocks in the flow charts and/or the block diagrams may be implemented by the hardware-based system that is specified in executing the defined functions or actions, or be implemented by the combination of specified hardware and computer instructions.

The embodiments of the present disclosure have been described above. The above description is illustrative, not exhaustive, and is not limited to the disclosed embodiments. Many modifications and variations will be apparent to those skilled in the art without departing from the scope and spirit of the described embodiments. The terminology used herein is chosen to best explain the principles, practical applications, or technical improvements in the market of the embodiments, or to enable other persons of ordinary skill in the art to understand the embodiments disclosed herein.

What is claimed is:

1. A method for entering a system management mode, wherein the method is applied to logical cores in a processor, the processor comprises at least one logical core and at least one module specific register (MSR), each of the at least one MSR stores an address related to a system management random access memory (SMRAM) corresponding to the logical core, and the SMRAM includes a core configuration information memory space configured to store core configuration information that corresponds to the logical core, and the method comprises:

entering the system management mode (SMM) in response to a system management interrupt (SMI);
    storing current state information into a state save area corresponding to the logical core;
    determining an address of the core configuration information memory space that corresponds to the logical core according to the address stored in the at least one MSR;
    setting an operating mode to a target operating mode by hardware of the processor before entering the SMM, wherein the target operating mode includes 64 bit mode and 32 bit mode; and
    executing an SMI handler under the target operating mode, wherein a mode switch is not performed during executing the SMI handler and the mode switch indicates switching the operating mode.

2. The method as claimed in claim 1, wherein the method further comprises:

determining the address of the core configuration information memory space that corresponds to the logical core according to the address stored in the at least one MSR, in which the core configuration information includes mode setting information, and the mode setting information indicates a setting value of each of registers corresponding to the target operating mode; and
    setting each of the registers corresponding to the target operating mode according to the mode setting information, wherein the registers corresponding to the target operating mode include one or more of the following: CR0 register, CR3 register, CR4 register, EFER register, segment register, and CS register; wherein the segment registers include one or more DS register, ES register, FS register, and GS register.

3. The method as claimed in claim 2, wherein a PG bit and a PE bit of the CR0 register are set to 1, the CR3 register indicates an address of a page where programs are located in the SMM; wherein the CR4 register indicates basic configuration information of the processor; wherein a LME bit of the EFER register is set to 1; wherein an L bit of the CS register is set to 1, which indicates that the 64 bit mode is enabled.

4. The method as claimed in claim 1, wherein the core configuration information includes: mode control information, which is configured to indicate the target operating mode that the logical core needs to enter.

5. The method as claimed in claim 1, wherein the SMRAM includes the state save area, wherein the method further comprises: determining an address of the state save area that corresponds to the logical core according to the address stored in the at least one MSR.

6. The method as claimed in claim 1, wherein the method further comprises:

setting each of registers corresponding to an operating environment according to operating environment information, wherein the registers corresponding to the operating environment include general purpose registers, in which the core configuration information includes the operating environment information, and the operating environment information can indicate a setting value of each of the registers of the logical core corresponding to the operating environment in the SMM.

7. The method as claimed in claim 6, wherein the at least one logical core includes a first logical core and at least one second logical core; wherein the at least one MSR includes a first MSR configured to store a base address of the first logical core, and the first MSR is fabricated outside the logical cores;

wherein in each SMRAM, a memory space corresponding to a preset address offset of the state save area is the state save area of the logical core corresponding to the SMRAM, and a memory space corresponding to a preset address offset of the core configuration information is the core configuration information memory space of the logical core corresponding to the SMRAM; wherein a base address of the SMRAM is an address of the SMI handler;

wherein the method comprises:

using the first logical core to determine the base address obtained from the first MSR as the base address of the SMRAM corresponding to the first logical core; and/or determining, using the second logical core, the base address of the SMRAM corresponding to the second logical core according to the association between the base address obtained from the first MSR and the base address corresponding to the second logical core.

8. The method as claimed in claim 6, wherein the at least one MSR includes a second MSR for each of the logical cores, and each second MSR is configured to store a base address of the SMRAM of the logical core corresponding to the second MSR;

wherein in each SMRAM, a memory space corresponding to a preset address offset of the state save area is the state save area of the logical core corresponding to the SMRAM, and a memory space corresponding to a preset address offset of the core configuration information is the core configuration information memory space of the logical core corresponding to the SMRAM; wherein a base address of the SMRAM is an address of the SMI handler;

wherein the method further comprises: determining, using each of the logical cores, the base address obtained from the second MSR as the base address of the SMRAM corresponding to the logical core.

9. The method as claimed in claim 6, wherein the core configuration information includes an address of the SMI handler.

10. The method as claimed in claim 9, wherein the at least one MSR includes a third MSR and a fourth MSR for each of the logical cores, each third MSR is configured to store an address of the state save area of the logical core corresponding to the third MSR, and each fourth MSR is configured to store the address of the core configuration information memory space of the logical core corresponding to the fourth MSR.

11. The method as claimed in claim 9, wherein the core configuration information memory space stores a configuration information structure generated by the core configuration information of the logical core corresponding to the core configuration information memory space, the configuration information structure includes a plurality of information fields, and each of the information fields is configured to store the core configuration information or a memory address of the core configuration information.

12. The method as claimed in claim 9, wherein the at least one MSR includes a second MSR for each of the logical cores, and each second MSR is configured to store the address of the core configuration information memory space and an address of the state save area of the logical core corresponding to the second MSR.

13. The method as claimed in claim 6, wherein the SMRAM further comprises:

a handler memory space configured to store the SMI handler.

14. The method as claimed in claim 13, wherein the at least one MSR includes a third MSR, a fourth MSR, and a fifth MSR for each of the logical cores, each third MSR is configured to store an address of the state save area of the logical core corresponding to the third MSR, each fourth MSR is configured to store the address of the core configuration information memory space of the logical core corresponding to the fourth MSR, and each fifth MSR is configured to store an address of the handler memory space of the logical core corresponding to the fifth MSR.

15. The method as claimed in claim 13, wherein the at least one MSR includes a second MSR for each of the logical cores, and each second MSR is configured to store an address of the state save area, the address of the core configuration information memory space, and an address of the handler memory space of the logical cores corresponding to the second MSR.

16. The method as claimed in claim 13, wherein the at least one MSR includes a third MSR and a fourth MSR for each of the logical cores, any two of an address of the state save area, the address of the core configuration information memory space, and an address of the handler memory space of the logical core are stored in the third MSR corresponding to the logical core, while the other one is stored in the fourth MSR corresponding to the logical core.

17. A processor, comprising at least one logical core and at least one module specific register (MSR), the logical cores are configured to execute response execution steps after the execution of initialization settings, and each of the at least one MSR stores an address related to a system management random access memory (SMRAM) corresponding to the logical core, and the SMRAM includes a core configuration information memory space configured to store core configuration information that corresponds to the logical core, wherein the response execution steps comprise:

entering a system management mode (SMM) in response to a system management interrupt (SMI);

storing current state information into a state save area corresponding to the logical core;

determining an address of the core configuration information memory space that corresponds to the logical core according to the address stored in the at least one MSR;

setting an operating mode to a target operating mode before entering the SMM; and executing an SMI handler under the target operating mode by hardware of the processor, wherein the target operating mode includes 64 bit mode and 32 bit mode, wherein a mode switch is not performed during executing the SMI handler and the mode switch indicates switching the operating mode.

18. The processor as claimed in claim 17, wherein the response execution steps executed by the logical cores further comprise:

determining the address of the core configuration information memory space that corresponds to the logical core according to the address stored in the at least one MSR, in which the core configuration information includes mode setting information, and the mode setting information indicates a setting value of each register that corresponds to the target operating mode; and setting each register that corresponds to the target operating mode according to the mode setting information, wherein the registers corresponding to the target operating mode include one or more of the following: CR0 register, CR3 register, CR4 register, EFER register, segment register, and CS register; wherein the segment registers include one or more DS register, ES register, FS register, and GS register.

19. The processor as claimed in claim 18, wherein a PG bit and a PE bit of the CR0 register are set to 1, the CR3 register indicates an address of a page where programs are located in the SMM; wherein the CR4 register indicates basic configuration information of the processor; wherein a LME bit of the EFER register is set to 1; and wherein an L bit of the CS register is set to 1, which indicates that the 64 bit mode is enabled.

20. The processor as claimed in claim 17, wherein the core configuration information includes: mode control information, which is configured to indicate the target operating mode that the logical core needs to enter.

21. The processor as claimed in claim 17, wherein the SMRAM includes the state save area,
wherein the response execution steps executed by the logical cores further comprise: determining an address of the state save area that corresponds to the logical core according to the address stored in the at least one MSR.

22. The processor as claimed in claim 17, wherein the response execution steps executed by the logical cores further comprise:
setting each of registers corresponding to an operating environment according to operating environment information, wherein the registers corresponding to the operating environment include general purpose registers, in which the core configuration information includes the operating environment information, and the operating environment information can indicate a setting value of each of the registers of the logical core corresponding to the operating environment in the SMM.

23. The processor as claimed in claim 22, wherein the at least one logical core includes a first logical core and at least one second logical core; wherein the at least one MSR includes a first MSR configured to store a base address of the first logical core, and the first MSR is fabricated outside the logical cores;
wherein in each SMRAM, a memory space corresponding to a preset address offset of the state save area is the state save area of the logical core corresponding to the SMRAM, and a memory space corresponding to a preset address offset of the core configuration information is the core configuration information memory space of the logical cores corresponding to the SMRAM; wherein a base address of the SMRAM is an address of the SMI handler;
wherein the response execution steps executed by the logical cores comprise:
determining, using the first logical core, the base address obtained from the first MSR as the base address of the SMRAM corresponding to the first logical core; and/or
determining, using the second logical core, the base address of the SMRAM corresponding to the second logical core according to the association between the base address obtained from the first MSR and the base address corresponding to the second logical core.

24. The processor as claimed in claim 22, wherein the at least one MSR includes a second MSR for each of the logical cores, and each second MSR is configured to store a base address of the SMRAM of the logical core corresponding to the second MSR;
wherein in each SMRAM, a memory space corresponding to a preset address offset of the state save area is the state save area of the logical core corresponding to the SMRAM, a memory space corresponding to a preset address offset of the core configuration information is the core configuration information memory space of the logical core corresponding to the SMRAM; wherein the base address of the SMRAM is an address of the SMI handler;
wherein the response execution steps executed by the logical cores further comprise using each of the logical cores to determine the base address obtained from the second MSR as the base address of the SMRAM corresponding to the logical core.

25. The processor as claimed in claim 22, wherein the core configuration information includes an address of the SMI handler.

26. The processor as claimed in claim 25, wherein the at least one MSR includes a third MSR and a fourth MSR for each of the logical cores, each third MSR is configured to store an address of the state save area of the logical core corresponding to the third MSR, and each fourth MSR is configured to store the address of the core configuration information memory space of the logical core corresponding to the fourth MSR.

27. The processor as claimed in claim 25, wherein the core configuration information memory space stores a configuration information structure generated by the core configuration information of the logical core corresponding to the core configuration information memory space, the configuration information structure includes a plurality of information fields, and each of the information fields is configured to store the core configuration information or the memory address of the core configuration information.

28. The processor as claimed in claim 25, wherein the at least one MSR includes a second MSR for each of the logical cores, and each second MSR is configured to store the address of the core configuration information memory space and the address of the state save area of the logical core corresponding to the second MSR.

29. The processor as claimed in claim 22, wherein the SMRAM further comprises:
a handler memory space configured to store the SMI handler.

30. The processor as claimed in claim 29, wherein the at least one MSR includes a third MSR, a fourth MSR, and a fifth MSR for each of the logical cores, each third MSR is configured to store an address of the state save area of the logical core corresponding to the third MSR, each fourth MSR is configured to store the address of the core configuration information memory space of the logical cores corresponding to the third MSR, and each fifth MSR is configured to store an address of the handler memory space of the logical core corresponding to the third MSR.

31. The processor as claimed in claim 29, wherein the at least one MSR includes a second MSR for each of the logical cores, and each second MSR is configured to store an address of the state save area, the address of the core configuration information memory space, and an address of the handler memory space of the logical core corresponding to the second MSR.

32. The processor as claimed in claim 29, wherein the at least one MSR includes a third MSR and a fourth MSR for each of the logical cores, wherein any two of an address of the state save area, the address of the core configuration information memory space, and an address of the handler memory space of the logical core are stored in the third MSR corresponding to the logical core, while the other one is stored in the fourth MSR corresponding to the logical core.

33. A computer system, comprising:

a processor including at least one logical core and at least one model specific register (MSR), each of the at least one MSR stores an address related to a system management random access memory (SMRAM) corresponding to the logical core, and the SMRAM includes a core configuration information memory space configured to store core configuration information that corresponds to the logical core; and a memory;

wherein the logical cores are configured to execute response execution steps after the execution of initialization settings, and the response execution steps comprise:

entering the system management mode (SMM) in response to a system management interrupt (SMI);

storing current state information to a corresponding state save area;

determining an address of the core configuration information memory space that corresponds to the logical core according to the address stored in the at least one MSR;

setting an operating mode to a target operating mode by hardware of the processor before entering the SMM, wherein the target operating mode includes 64 bit mode and 32 bit mode; and executing an SMI handler under the target operating mode, wherein a mode switch is not performed during executing the SMI handler and the mode switch indicates switching the operating mode.

\* \* \* \* \*